US012483484B2

United States Patent
Xu et al.

(10) Patent No.: US 12,483,484 B2
(45) Date of Patent: Nov. 25, 2025

(54) DEVICE IDENTIFICATION METHOD, APPARATUS, AND SYSTEM

(71) Applicant: Huawei Technologies Co., Ltd., Shenzhen (CN)

(72) Inventors: Weiwang Xu, Nanjing (CN); Li Xue, Nanjing (CN); Haonan Ye, Nanjing (CN); Jian Cheng, Nanjing (CN); Liang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/305,115

(22) Filed: Apr. 21, 2023

(65) Prior Publication Data

US 2023/0261948 A1 Aug. 17, 2023

Related U.S. Application Data

(63) Continuation of application No. PCT/CN2021/124990, filed on Oct. 20, 2021.

(30) Foreign Application Priority Data

Oct. 23, 2020 (CN) .......................... 202011145036.0
Feb. 27, 2021 (CN) .......................... 202110221855.7

(51) Int. Cl.
| | | |
|---|---|---|
| *G06F 15/173* | (2006.01) | |
| *H04L 41/147* | (2022.01) | |
| *H04L 43/04* | (2022.01) | |
| *H04L 61/5007* | (2022.01) | |
| *H04L 101/668* | (2022.01) | |

(52) U.S. Cl.
CPC ............ *H04L 41/147* (2013.01); *H04L 43/04* (2013.01); *H04L 61/5007* (2022.05); *H04L 2101/668* (2022.05)

(58) Field of Classification Search
CPC ..... H04L 43/04; H04L 41/142; H04L 41/147; H04L 61/5007; H04L 2101/668
USPC .................................. 709/223–224, 245–246
See application file for complete search history.

(56) References Cited

U.S. PATENT DOCUMENTS

| | | | | |
|---|---|---|---|---|
| 9,049,576 | B2 * | 6/2015 | Arsenault | ........... H04L 41/5064 |
| 9,060,269 | B2 * | 6/2015 | Wang | ................ H04W 72/0473 |
| 10,673,719 | B2 * | 6/2020 | Niv | ........................ H04L 63/145 |
| 11,456,994 | B2 * | 9/2022 | Reimer | ............... H04L 43/0876 |

(Continued)

FOREIGN PATENT DOCUMENTS

| | | |
|---|---|---|
| CN | 106714225 A | 5/2017 |
| CN | 108063698 A | 5/2018 |

(Continued)

*Primary Examiner* — Bharat Barot
(74) *Attorney, Agent, or Firm* — SLATER MATSIL, LLP

(57) ABSTRACT

A device identification method, apparatus, and system are provided. A management device or a collection device first determines a network traffic feature of a to-be-identified device based on a first dataset. The first dataset includes a plurality of pieces of first data, and each piece of first data includes a data amount of a data packet that is of the to-be-identified device and that is collected within one first periodicity. Then, the management device or the collection device determines a device type of the to-be-identified device based on a device identification model and the network traffic feature of the to-be-identified device.

13 Claims, 13 Drawing Sheets

(56) References Cited

U.S. PATENT DOCUMENTS

| | | | | |
|---|---|---|---|---|
| 12,062,911 | B1* | 8/2024 | Chaboud | H02J 13/00001 |
| 2017/0223040 | A1* | 8/2017 | Ikuse | H04L 63/1408 |
| 2017/0317899 | A1* | 11/2017 | Taylor | H04L 41/12 |
| 2018/0026995 | A1* | 1/2018 | Dufour | H04L 63/1408 |
| | | | | 726/23 |
| 2019/0012604 | A1* | 1/2019 | Hiratsuka | G06Q 30/0201 |
| 2020/0120004 | A1 | 4/2020 | Kohout et al. | |
| 2022/0329511 | A1* | 10/2022 | Woodworth | H04L 45/42 |
| 2022/0337603 | A1* | 10/2022 | Shah | H04L 63/1408 |
| 2023/0146463 | A1* | 5/2023 | Agarwal | H04L 67/535 |
| | | | | 726/23 |

FOREIGN PATENT DOCUMENTS

| | | |
|---|---|---|
| CN | 109063745 A | 12/2018 |
| CN | 109818793 A | 5/2019 |
| CN | 110034970 A | 7/2019 |
| CN | 110115015 A | 8/2019 |
| CN | 110336896 A | 10/2019 |
| CN | 110380989 A | 10/2019 |
| CN | 110958305 A | 4/2020 |
| CN | 111181969 A | 5/2020 |
| CN | 111757378 A | 10/2020 |
| WO | 2020178265 A1 | 9/2020 |

\* cited by examiner

DEVICE IDENTIFICATION METHOD, APPARATUS, AND SYSTEM

CROSS-REFERENCE TO RELATED APPLICATIONS

This application is a continuation of International Application No. PCT/CN2021/124990, filed on Oct. 20, 2021, which claims priority to Chinese Patent Application No. 202110221855.7, filed on Feb. 27, 2021, and Chinese Patent Application No. 202011145036.0, filed on Oct. 23, 2020. All of the aforementioned patent applications are hereby incorporated by reference in their entireties.

TECHNICAL FIELD

This application relates to the field of communication technologies, and in particular, to a device identification method, apparatus, and system.

BACKGROUND

There are a large quantity of Internet of Things (IoT) devices in various industries such as a smart campus, education, manufacturing, finance, and healthcare. These IoT devices and services are exposed to the Internet, are easy to become targets against which attackers launch large-scale distributed denial-of-service (DDoS) attacks, and also have a risk of being maliciously counterfeited for an illegal purpose. Device identification is performed on an IoT device that is in a network, to determine a device type of the IoT device, so as to separately search for security vulnerabilities for IoT devices of different device types. This helps improve security of the IoT device that is in the network.

In a related technology, an implementation process of performing device identification on the IoT device that is in the network includes: A management device first sends a specified protocol probe packet to the to-be-identified IoT device, to obtain a banner of the to-be-identified IoT device. The banner includes information that can be used to identify the IoT device. Then, the management device performs regular matching between product-related information that is of each type of IoT device and that is found from an official website or an e-commerce website of an IoT device vendor and the banner of the to-be-identified IoT device. If product-related information of an IoT device of a target type successfully matches the banner of the to-be-identified IoT device, it is determined that the device type corresponding to the to-be-identified IoT device is the target type. The product-related information that is of the IoT device and that is found from the official website or the e-commerce website of the IoT device vendor includes the vendor, a device type, a model, a version, and/or the like. The banner of the IoT device usually includes one or more of the information.

Because device identification needs to be performed based on the banner reported by the device, the device has a risk of interrupting a service, and reliability of running the service by the device is low.

SUMMARY

This application provides a device identification method, apparatus, and system, to resolve a problem that reliability of running a service by a device is low because device identification is performed on the device.

According to a first aspect, a device identification method is provided. The method includes: A management device determines a network traffic feature of a to-be-identified device based on a first dataset. The first dataset includes a plurality of pieces of first data, and each piece of first data includes a data amount of a data packet that is of the to-be-identified device and that is collected within one first periodicity. The management device determines a device type of the to-be-identified device based on a device identification model and the network traffic feature of the to-be-identified device.

In this application, the management device determines the network traffic feature of the to-be-identified device based on data amounts of data packets that are of the to-be-identified device and that are collected within a plurality of periodicities, and then determines the device type of the to-be-identified device based on the device identification model and the network traffic feature of the to-be-identified device. In a process of performing device identification on a device, the to-be-identified device does not need to report information used to identify the to-be-identified device. Therefore, a service that is run on the to-be-identified device is not interrupted, and reliability of running the service by the to-be-identified device is high.

Optionally, an implementation process in which the management device determines the network traffic feature of the to-be-identified device based on the first dataset includes: The management device generates, based on the first dataset, a first data amount time series $(T_n, S_n)$ corresponding to the to-be-identified device. $T_1$ represents an $n^{th}$ first periodicity, $S_n$ represents a data amount of a data packet that is of the to-be-identified device and that is collected within the $n^{th}$ first periodicity, and n is a positive integer. The management device determines the network traffic feature of the to-be-identified device based on the first data amount time series $(T_n, S_n)$.

Optionally, an implementation process in which the management device determines the network traffic feature of the to-be-identified device based on the first data amount time series $(T_n, S_n)$ includes: The management device determines, based on the first data amount time series $(T_n, S_n)$, a data amount distribution feature corresponding to the to-be-identified device; and/or the management device performs a frequency-domain change on the first data amount time series $(T_n, S_n)$ to obtain a data amount frequency-domain feature corresponding to the to-be-identified device. The data amount frequency-domain feature includes a frequency and/or an amplitude of the first data amount time series $(T_n, S_n)$. In other words, the network traffic feature includes the data amount distribution feature and/or the data amount frequency-domain feature.

Features of heartbeat flows of devices of different device types are different. For example, data amounts of heartbeat packets of the devices of different device types are different, and sending frequencies of the heartbeat packets are also different. Therefore, an essential feature that can distinguish the to-be-identified device from a device of another device type can be better extracted by counting the data amount distribution feature and/or the data amount frequency-domain feature corresponding to the to-be-identified device, so that device identification accuracy is high.

Optionally, an implementation process in which the management device generates, based on the first dataset, the first data amount time series $(T_n, S_n)$ corresponding to the to-be-identified device includes: In response to a case that the plurality of pieces of first data include data amounts of uplink data packets that are of the to-be-identified device and that are collected within a plurality of first periodicities, the management device generates, based on the first dataset, an uplink data amount time series corresponding to the to-be-identified device; and/or in response to a case that the plurality of pieces of first data include data amounts of downlink data packets that are of the to-be-identified device and that are collected within a plurality of first periodicities, the management device generates, based on the first dataset, a downlink data amount time series corresponding to the to-be-identified device. In other words, the first data amount time series corresponding to the to-be-identified device includes the uplink data amount time series and/or the downlink data amount time series corresponding to the to-be-identified device.

In a first implementation, the management device further obtains headers of a plurality of data packets collected by a collection device that is in a first network and a moment at which the collection device collects the plurality of data packets. The headers each include a source IP address, a destination IP address, and a packet length, and the first network is a network accessed by the to-be-identified device. The management device generates the first dataset based on the headers of the plurality of data packets and the moment at which the collection device collects the plurality of data packets.

Optionally, an implementation process in which the management device generates the first dataset based on the headers of the plurality of data packets and the moment at which the collection device collects the plurality of data packets includes: The management device counts the data amounts of the uplink data packets, that are of the to-be-identified device within the plurality of first periodicities, based on a packet length in a first header whose source IP address is an IP address of the to-be-identified device in the headers of the plurality of data packets and a moment at which the collection device collects a data packet in which the first header is located; and/or the management device counts the data amounts of the downlink data packets, that are of the to-be-identified device within the plurality of first periodicities, based on a packet length in a second header whose destination IP address is an IP address of the to-be-identified device in the headers of the plurality of data packets and a moment at which the collection device collects a data packet in which the second header is located.

In this application, the management device only needs to obtain and parse the header of the data packet collected by the collection device and the moment at which the collection device collects the data packet, to count a data amount of a data packet that is of the to-be-identified device within each first periodicity. In a process of performing device identification on the to-be-identified device, data content of the data packet does not need to be parsed, so that data security in the data packet is high.

Optionally, after obtaining the headers of the plurality of data packets collected by the collection device that is in the first network, the management device obtains, through screening, a header of a data packet whose packet length is less than a target length threshold in the headers of the plurality of data packets. Correspondingly, the implementation process in which the management device generates the first dataset based on the headers of the plurality of data packets and the moment at which the collection device collects the plurality of data packets includes: The management device generates the first dataset based on a plurality of headers obtained through screening and a moment at which the collection device collects data packets in which the plurality of headers obtained through screening are located.

A packet length of a heartbeat packet and a packet length of a service packet are generally shorter, and a length of an update packet is generally longer. Therefore, in this application, a data packet with a longer packet length is screened out by setting the target length threshold, that is, an update packet in the data packet collected by the collection device is eliminated. This can better reflect a feature of a heartbeat packet, thereby improving device identification accuracy.

Optionally, in the first implementation, the management device sends a traffic collection instruction to the collection device that is in the first network. The traffic collection instruction is used to instruct the collection device to collect a header of a data packet in the first network. An implementation process in which the management device obtains the headers of the plurality of data packets collected by the collection device that is in the first network and the moment at which the collection device collects the plurality of data packets includes: The management device receives the headers that are of the plurality of data packets and that are sent by the collection device that is in the first network and the moment at which the collection device collects the plurality of data packets.

Optionally, the traffic collection instruction includes an identifier of the to-be-identified device, and the traffic collection instruction is used to instruct the collection device to collect a header of a data packet of the to-be-identified device.

In this application, the management device can collect traffic of a single device by adding the identifier of the to-be-identified device to the traffic collection instruction, and then implement device identification of the single device in a directional manner.

In a second implementation, the management device sends a statistical information collection instruction to a collection device that is in a first network. In response to a case that the statistical information collection instruction instructs the collection device to count data amounts of data packets that are of the to-be-identified device and that are collected within the plurality of first periodicities, the management device receives the plurality of pieces of first data sent by the collection device that is in the first network, to obtain the first dataset. Alternatively, in response to a case that the statistical information collection instruction instructs the collection device to count data amounts of data packets that are of the to-be-identified device and that are collected at a plurality of collection moments, the management device receives a plurality of pieces of second data sent by the collection device that is in the first network, and generates the first dataset based on the plurality of pieces of second data. Each piece of second data includes one collection moment and a data amount of a data packet that is of the to-be-identified device and that is collected at the collection moment.

In this application, the collection device can collect only a header of a data packet and send the header of the data packet to the management device. Alternatively, after collecting a header of a data packet, the collection device can count a data amount of a data packet that is of the to-be-identified device at each collection moment, and send the data amount to the management device. Alternatively, after collecting a header of the data packet, the collection device can count data amounts of the data packets that are of the to-be-identified device within the plurality of periodicities, and send the data amounts to the management device. A function distribution manner of the collection device and the management device is not limited in this application.

Optionally, the to-be-identified device is an Internet of Things device.

Optionally, the management device further determines a network traffic feature of a known device based on a second dataset. The second dataset includes a plurality of pieces of third data, and each piece of third data includes a data amount of a data packet that is of the known device and that is collected within one second periodicity. The management device generates the device identification model based on network traffic features of a plurality of known devices and device types of the plurality of known devices.

Optionally, the management device further obtains headers of a plurality of data packets collected by a collection device that is in a second network and a moment at which the collection device collects the plurality of data packets. The headers each include a source IP address, a destination IP address, and a packet length, and the second network is a network accessed by the known device. Next, the management device obtains a header of a data packet of the known device from the headers of the plurality of data packets based on prior information. The prior information includes a plurality of device types and identifiers of a plurality of known devices corresponding to each of the device types. Then, the management device generates the second dataset based on a packet length in the header of the data packet of the known device and a moment at which the collection device collects the data packet of the known device.

In this application, the plurality of device types included in the prior information can include all device types of a device accessing the second network, and the prior information can include all device types that may correspond to the to-be-identified device. In addition, the prior information can include identifiers of as many known devices as possible corresponding to each device type, to provide sufficient samples for model training, so that inference accuracy of the model obtained through training is high.

Optionally, an implementation process in which the management device determines the network traffic feature of the known device based on the second dataset includes: The management device generates, based on the second dataset, a second data amount time series $(T_m, S_m)$ corresponding to the known device. $T_m$ represents an $m^{th}$ second periodicity, $S_m$ represents a data amount of a data packet that is of the known device and that is collected within the $m^{th}$ second periodicity, and m is a positive integer. The management device determines the network traffic feature of the known device based on the second data amount time series $(T_m, S_m)$.

Optionally, an implementation process in which the management device determines the network traffic feature of the known device based on the second data amount time series $(T_m, S_m)$ includes: The management device determines, based on the second data amount time series $(T_m, S_m)$, a data amount distribution feature corresponding to the known device; and/or the management device performs a frequency-domain change on the second data amount time series $(T_m, S_m)$ to obtain a data amount frequency-domain feature corresponding to the known device. The data amount frequency-domain feature includes a frequency and/or an amplitude of the second data amount time series $(T_m, S_m)$.

Alternatively, the management device receives a device identification model from another device or platform. In other words, the device identification model may be from the another device or platform.

According to a second aspect, a device identification method is provided. The method includes: A collection device determines a network traffic feature of a to-be-identified device based on a first dataset. The first dataset includes a plurality of pieces of first data, and each piece of first data includes a data amount of a data packet that is of the to-be-identified device and that is collected within one first periodicity. The collection device determines a device type of the to-be-identified device based on a device identification model and the network traffic feature of the to-be-identified device.

In this application, the collection device determines the network traffic feature of the to-be-identified device based on data amounts of data packets that are of the to-be-identified device and that are collected within a plurality of periodicities, and then determines the device type of the to-be-identified device based on the device identification model and the network traffic feature of the to-be-identified device. In a process of performing device identification on a device, the to-be-identified device does not need to report information used to identify the to-be-identified device. Therefore, a service that is run on the to-be-identified device is not interrupted, and reliability of running the service by the to-be-identified device is high.

Optionally, an implementation process in which the collection device determines the network traffic feature of the to-be-identified device based on the first dataset includes: The collection device generates, based on the first dataset, a first data amount time series $(T_n, S_n)$ corresponding to the to-be-identified device. $T_n$ represents an $n^{th}$ first periodicity, $S_n$ represents a data amount of a data packet that is of the to-be-identified device and that is collected within the $n^{th}$ first periodicity, and n is a positive integer. The collection device determines the network traffic feature of the to-be-identified device based on the first data amount time series $(T_n, S_n)$.

Optionally, an implementation process in which the collection device determines the network traffic feature of the to-be-identified device based on the first data amount time series $(T_n, S_n)$ includes: The collection device determines, based on the first data amount time series $(T_n, S_n)$, a data amount distribution feature corresponding to the to-be-identified device; and/or the collection device performs a frequency-domain change on the first data amount time series $(T_n, S_n)$ to obtain a data amount frequency-domain feature corresponding to the to-be-identified device. The data amount frequency-domain feature includes a frequency and/or an amplitude of the first data amount time series $(T_n, S_n)$. In other words, the network traffic feature includes the data amount distribution feature and/or the data amount frequency-domain feature.

Features of heartbeat flows of devices of different device types are different. For example, data amounts of heartbeat packets of the devices of different device types are different, and sending frequencies of the heartbeat packets are also different. Therefore, an essential feature that can distinguish the to-be-identified device from a device of another device type can be better extracted by counting the data amount distribution feature and/or the data amount frequency-domain feature corresponding to the to-be-identified device, so that device identification accuracy is high.

Optionally, an implementation process in which the collection device generates, based on the first dataset, the first data amount time series $(T_n, S_n)$ corresponding to the to-be-identified device includes: In response to a case that the plurality of pieces of first data include data amounts of uplink data packets that are of the to-be-identified device and that are collected within a plurality of first periodicities, the collection device generates, based on the first dataset, an uplink data amount time series corresponding to the to-be-identified device; and/or in response to a case that the plurality of pieces of first data include data amounts of downlink data packets that are of the to-be-identified device and that are collected within a plurality of first periodicities, the collection device generates, based on the first dataset, a downlink data amount time series corresponding to the to-be-identified device. In other words, the first data amount time series corresponding to the to-be-identified device includes the uplink data amount time series and/or the downlink data amount time series corresponding to the to-be-identified device.

Optionally, the collection device further obtains headers of a plurality of data packets collected by a collection device that is in a first network and a moment at which the collection device collects the plurality of data packets. The headers each include a source IP address, a destination IP address, and a packet length, and the first network is a network accessed by the to-be-identified device. The collection device generates the first dataset based on the headers of the plurality of data packets and the moment at which the collection device collects the plurality of data packets.

Optionally, an implementation process in which the collection device generates the first dataset based on the headers of the plurality of data packets and the moment at which the collection device collects the plurality of data packets includes: The collection device counts the data amounts of the uplink data packets, that are of the to-be-identified device within the plurality of first periodicities, based on a packet length in a first header whose source IP address is an IP address of the to-be-identified device in the headers of the plurality of data packets and a moment at which the collection device collects a data packet in which the first header is located; and/or the collection device counts the data amounts of the downlink data packets, that are of the to-be-identified device within the plurality of first periodicities, based on a packet length in a second header whose destination IP address is an IP address of the to-be-identified device in the headers of the plurality of data packets and a moment at which the collection device collects a data packet in which the second header is located.

In this application, the collection device only needs to obtain and parse the header of the data packet collected by the collection device and the moment at which the collection device collects the data packet, to count a data amount of a data packet that is of the to-be-identified device within each first periodicity. In a process of performing device identification on the to-be-identified device, data content of the data packet does not need to be parsed, so that data security in the data packet is high.

Optionally, after obtaining the headers of the plurality of data packets collected by the collection device that is in the first network, the collection device obtains, through screening, a header of a data packet whose packet length is less than a target length threshold in the headers of the plurality of data packets. Correspondingly, the implementation process in which the collection device generates the first dataset based on the headers of the plurality of data packets and the moment at which the collection device collects the plurality of data packets includes: The collection device generates the first dataset based on a plurality of headers obtained through screening and a moment at which the collection device collects data packets in which the plurality of headers obtained through screening are located.

A packet length of a heartbeat packet and a packet length of a service packet are generally shorter, and a length of an update packet is generally longer. Therefore, in this application, a data packet with a longer packet length is screened out by setting the target length threshold, that is, an update packet in the data packet collected by the collection device is eliminated. This can better reflect a feature of a heartbeat packet, thereby improving device identification accuracy.

Optionally, the to-be-identified device is an Internet of Things device.

Optionally, the collection device further determines a network traffic feature of a known device based on a second dataset. The second dataset includes a plurality of pieces of third data, and each piece of third data includes a data amount of a data packet that is of the known device and that is collected within one second periodicity. The collection device generates the device identification model based on network traffic features of a plurality of known devices and device types of the plurality of known devices.

Optionally, the collection device further obtains headers of a plurality of data packets collected by a collection device that is in a second network and a moment at which the collection device collects the plurality of data packets. The headers each include a source IP address, a destination IP address, and a packet length, and the second network is a network accessed by the known device. Next, the collection device obtains a header of a data packet of the known device from the headers of the plurality of data packets based on prior information. The prior information includes a plurality of device types and identifiers of a plurality of known devices corresponding to each of the device types. Then, the collection device generates the second dataset based on a packet length in the header of the data packet of the known device and a moment at which the collection device collects the data packet of the known device.

In this application, the plurality of device types included in the prior information can include all device types of a device accessing the second network, and the prior information can include all device types that may correspond to the to-be-identified device. In addition, the prior information can include identifiers of as many known devices as possible corresponding to each device type, to provide sufficient samples for model training, so that inference accuracy of the model obtained through training is high.

Optionally, an implementation process in which the collection device determines the network traffic feature of the known device based on the second dataset includes: The collection device generates, based on the second dataset, a second data amount time series $(T_m, S_m)$ corresponding to the known device. $T_m$ represents an $m^{th}$ second periodicity, $S_m$ represents a data amount of a data packet that is of the known device and that is collected within the $m^{th}$ second periodicity, and m is a positive integer. The collection device determines the network traffic feature of the known device based on the second data amount time series $(T_m, S_m)$.

Optionally, an implementation process in which the collection device determines the network traffic feature of the known device based on the second data amount time series $(T_m, S_m)$ includes: The collection device determines, based on the second data amount time series $(T_m, S_m)$, a data amount distribution feature corresponding to the known device; and/or the collection device performs a frequency-domain change on the second data amount time series $(T_m, S_m)$ to obtain a data amount frequency-domain feature corresponding to the known device. The data amount frequency-domain feature includes a frequency and/or an amplitude of the second data amount time series $(T_m, S_m)$.

Alternatively, the collection device receives a device identification model from another device or platform. In other words, the device identification model may be from the another device or platform.

According to a third aspect, a device identification apparatus is provided. The apparatus may be a management device. The apparatus includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on a specific implementation.

According to a fourth aspect, a device identification apparatus is provided. The apparatus may be a collection device. The apparatus includes a plurality of functional modules. The plurality of functional modules interact with each other to implement the method according to the second aspect and the implementations of the second aspect. The plurality of functional modules may be implemented based on software, hardware, or a combination of software and hardware, and the plurality of functional modules may be randomly combined or divided based on a specific implementation.

According to a fifth aspect, a management device is provided, including a processor and a memory.

The memory is configured to store a computer program, and the computer program includes program instructions.

The processor is configured to invoke the computer program to implement the method according to the first aspect and the implementations of the first aspect.

According to a sixth aspect, a collection device is provided, including a processor and a memory.

The memory is configured to store a computer program, and the computer program includes program instructions.

The processor is configured to invoke the computer program to implement the method according to the second aspect and the implementations of the second aspect.

According to a seventh aspect, a device identification system is provided, including a collection module, a counting module, and an identification module. The collection module is configured to: collect a header of a data packet in a network, and send, to the counting module, collected headers of a plurality of data packets and a moment at which the collection module collects the plurality of data packets. The headers each include a source Internet Protocol IP address, a destination IP address, and a packet length. The counting module is configured to: generate a first dataset based on the headers of the plurality of data packets and the moment at which the collection module collects the plurality of data packets, and send the first dataset to the identification module. The first dataset includes a plurality of pieces of first data, and each piece of first data includes a data amount of a data packet that is of the to-be-identified device and that is collected within one first periodicity. The identification module is configured to: determine a network traffic feature of the to-be-identified device based on the first dataset, and determine a device type of the to-be-identified device based on a device identification model and the network traffic feature of the to-be-identified device.

Optionally, the system further includes a management module. The management module is configured to send a traffic collection instruction to the collection module. The traffic collection instruction is used to instruct the collection module to collect the header of the data packet in the network. The collection module is configured to collect the header of the data packet in the network based on the traffic collection instruction.

Optionally, the collection module is in a collection device, and the management module, the counting module, and the identification module are in a management device. Alternatively, the collection module and the counting module are in a collection device, and the management module and the identification module are in a management device.

Optionally, the traffic collection instruction includes an identifier of the to-be-identified device, and the traffic collection instruction is used to instruct the collection device to collect a header of a data packet of the to-be-identified device. The collection module is configured to collect, based on the traffic collection instruction, a header of a data packet that is of the to-be-identified device and that is in the network.

Optionally, the system further includes a training module. The collection module is further configured to send, to the training module, the collected headers of the plurality of data packets and the moment at which the collection module collects the plurality of data packets. The training module is configured to: generate a second dataset based on prior information, the headers of the plurality of data packets, and the moment at which the collection module collects the plurality of data packets, determine network traffic features of a plurality of known devices based on the second dataset, then generate the device identification model based on the network traffic features of the plurality of known devices and device types of the plurality of known devices, and send the device identification model to the identification module. The prior information includes a plurality of device types and identifiers of a plurality of known devices corresponding to each of the device types. The second dataset includes a plurality of pieces of second data, and each piece of second data includes a data amount of a data packet that is of the known device and that is collected within one second periodicity.

Optionally, the collection module, the counting module, and the identification module are in the collection device, and the training module is in the management device. Alternatively, the collection module is in the collection device, and the counting module, the identification module, and the training module are in the management device. Alternatively, the collection module and the counting module are in the collection device, and the identification module and the training module are in the management device.

According to an eighth aspect, a computer-readable storage medium is provided. The computer-readable storage medium stores instructions. When the instructions are executed by a processor of a management device, the method according to the first aspect and the implementations of the first aspect is implemented. Alternatively, when the instructions are executed by a processor of a collection device, the method according to the second aspect and the implementations of the second aspect is implemented.

According to a ninth aspect, a computer program product is provided. The computer program product includes computer instructions, and the computer instructions are stored in a computer-readable storage medium. A processor of a management device reads the computer instructions from the computer-readable storage medium and executes the computer instructions, to implement the method according to the first aspect and the implementations of the first aspect. Alternatively, a processor of a collection device reads the computer instructions from the computer-readable storage medium and executes the computer instructions, to implement the method according to the second aspect and the implementations of the second aspect.

According to a tenth aspect, a chip is provided. The chip includes a programmable logic circuit and/or program instructions. When the chip runs, the method according to the first aspect and the implementations of the first aspect or the method according to the second aspect and the implementations of the second aspect is implemented.

Beneficial effects brought by the technical solutions provided in this application include at least the following.

In this application, the network traffic feature of the to-be-identified device is determined based on the data amounts of the data packets that are of the to-be-identified device and that are collected by the collection device within the plurality of periodicities, and then the device identification model is invoked to determine the device type of the to-be-identified device based on the network traffic feature of the to-be-identified device. In the process of performing device identification on the device, the to-be-identified device does not need to report the information used to identify the to-be-identified device. Therefore, the service that is run on the to-be-identified device is not interrupted, and reliability of running the service by the to-be-identified device is high. In addition, only the header of the data packet collected by the collection device and the moment at which the collection device collects the data packet need to be obtained and parsed, to count the data amount of the data packet that is of the to-be-identified device within each first periodicity. In the process of performing device identification on the to-be-identified device, the data content of the data packet does not need to be parsed, so that security of data in the data packet is high. In this application, a small-sample semi-supervised manner is used. A user only needs to provide all device types of a device that is in a network and a part of IP addresses corresponding to each device type, to count all IP addresses (namely, all devices) corresponding to all the device types in the network. This solution has high implementability.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
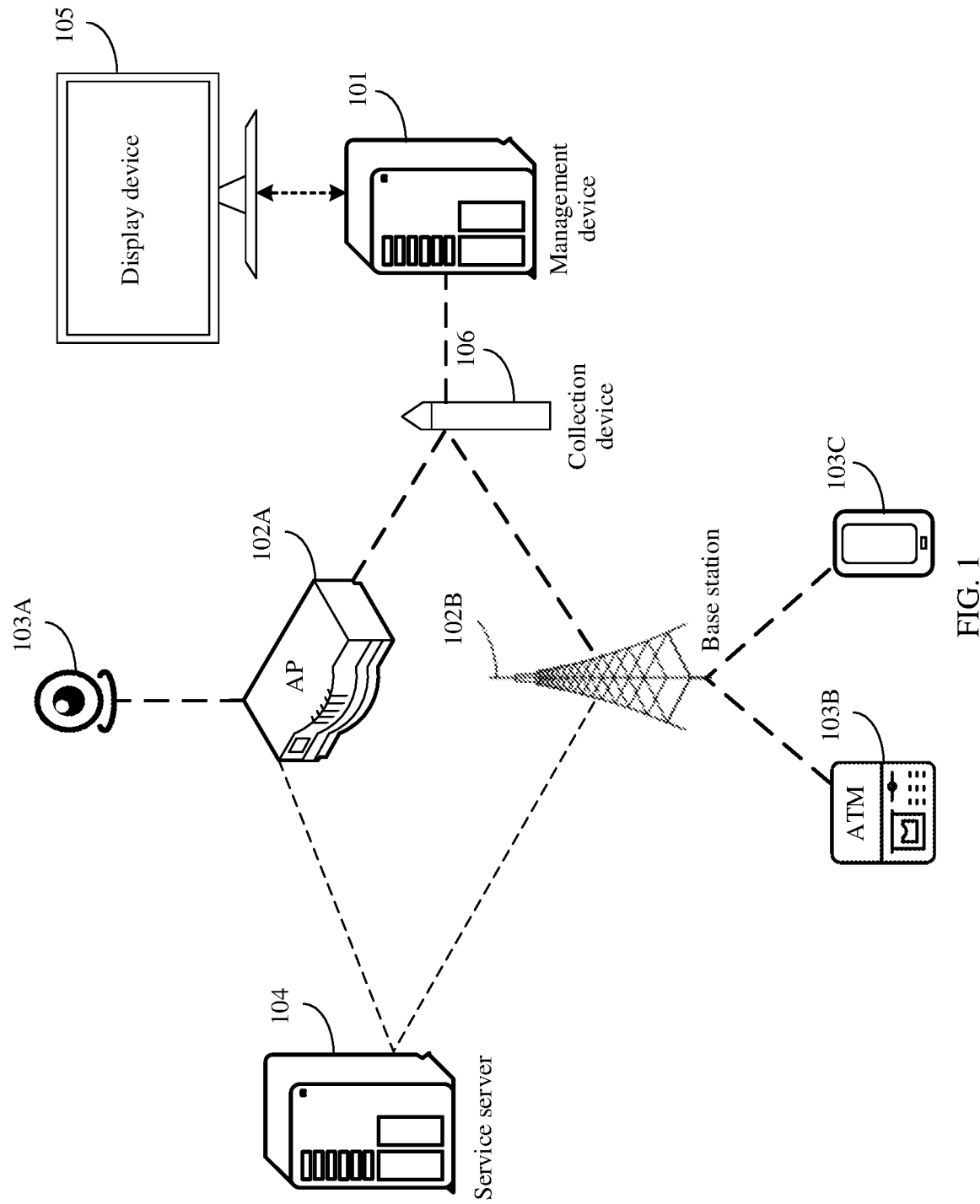
FIG. 1 is a schematic diagram of an application scenario of a device identification method according to an embodiment of this application.
Figure 2:
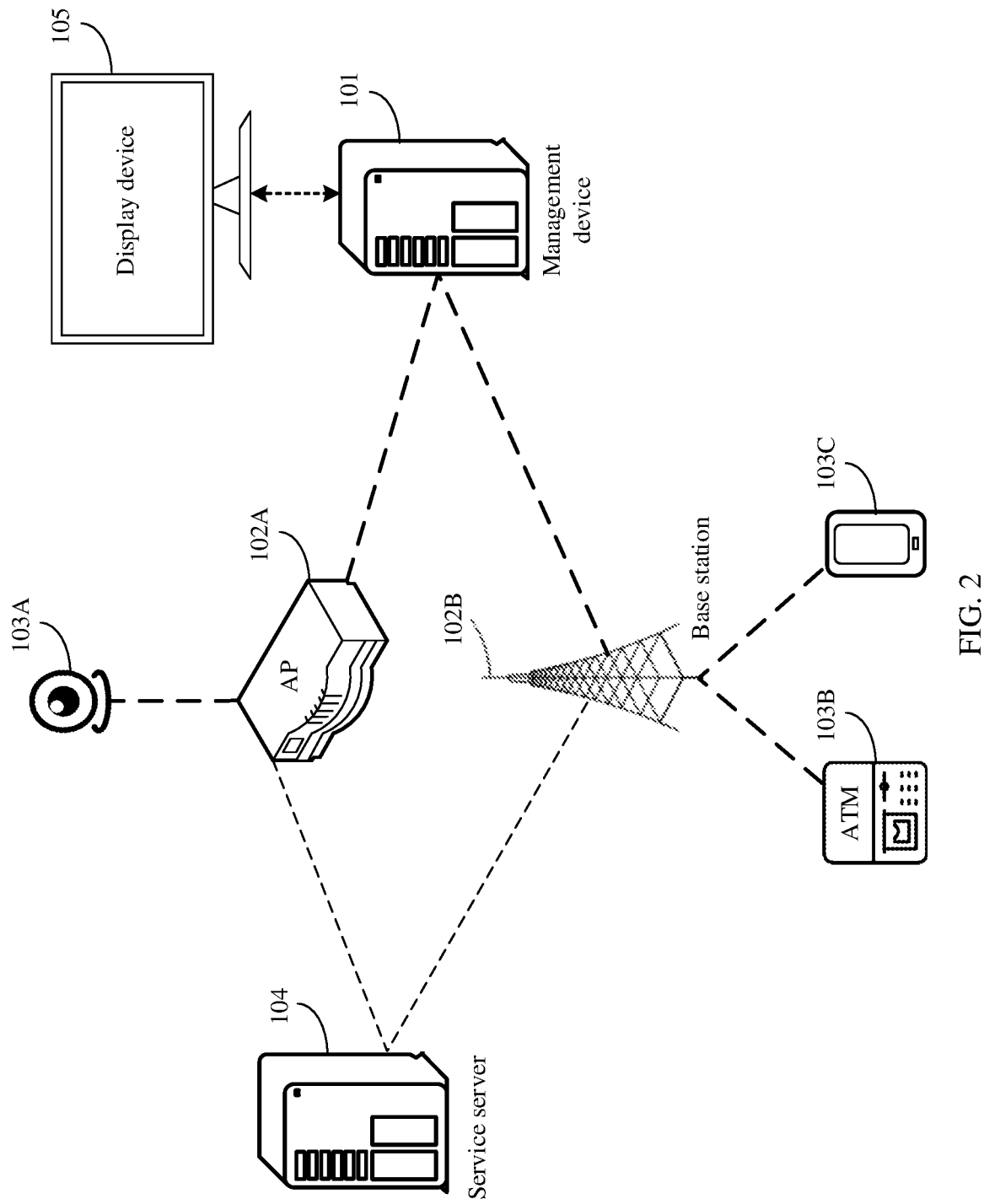
FIG. 2 is a schematic diagram of another application scenario of a device identification method according to an embodiment of this application.

FIG. 1 and FIG. 2 are respectively schematic diagrams of application scenarios of a device identification method according to an embodiment of this application. As shown in FIG. 1 or FIG. 2, in the application scenario, a management device 101, forwarding devices 102A and 102B (collectively referred to as forwarding devices 102), and devices 103A to 103C (collectively referred to as devices 103) are included. A quantity of the forwarding devices, a quantity of the devices, and a connection manner in FIG. 1 are merely used as examples for description, and are not used as a limitation on the application scenario provided in this embodiment of this application.

The management device 101 may also be referred to as a security monitoring platform or an asset management platform. The management device 101 may be specifically a server, or a server cluster including several servers, or a cloud computing center (that is, a service provided by the management device 101 is deployed on a cloud).

The forwarding device 102 is configured to connect the device 101 to a network. The network may be a wireless local area network (WLAN) or a mobile cellular network. The forwarding device 102 may be specifically a gateway, a router, an access point (AP), a base station, a switch, or the like. For example, the forwarding device 102A is an AP, and the forwarding device 102A is configured to connect the device 103A to a WLAN. For another example, the forwarding device 102B is a base station (for example, a 4G base station or a 5G base station), and the forwarding device 102B is configured to connect a device 103B and the device 103C to a mobile cellular network.

Optionally, the device 103 is an IoT device. The devices 103 may be various types of terminals. For example, in a financial system, the device 103 may be an automated teller machine (ATM), a self-service query terminal, a card issuer, a smart counter, or a surveillance camera. The device 103 is connected to the forwarding device 102 through a wired network or a wireless network. The device 103 communicates with a service server 104 by using the forwarding device 102, that is, the forwarding device 102 is configured to forward a data packet between the device 103 and the service server 104. For example, in the application scenario shown in FIG. 1, the device 103A accesses the WLAN by using the forwarding device 102A, to implement communication with the service server 104, that is, the forwarding device 102A is configured to forward a data packet between the device 103A and the service server 104. The device 103B and the device 103C access the mobile cellular network by using the forwarding device 102B, to implement communication with the service server 104, that is, the forwarding device 102B is configured to forward a data packet between the device 103B, the device 103C, and the service server 104.

Optionally, still refer to FIG. 1 and FIG. 2. In the application scenario, a display device 105 is further included. The display device 105 is connected to the management device 101 through a wired network or a wireless network. The display device 105 is configured to provide a visual interface that can be used to interact with the management device 101. The visual interface may also be referred to as a user interface. The display device 105 allows a user to input information on the user interface to send the information to the management device 101, and allows the user to view, on the user interface, information sent by the management device 101. The display device 105 may be an operations support system (OSS) or another device having a display function. Optionally, the management device 101 and the display device 105 may be alternatively integrated into one device. This is not limited in this embodiment of this application.

Optionally, still refer to FIG. 1. In the application scenario, a collection device 106 is further included. The collection device 106 is connected to the management device 101 through a wired network or a wireless network. The collection device 106 is configured to collect a header of a data packet in a network. The collection device 106 may be an independent device, for example, may be a network probe. Alternatively, refer to FIG. 2. The forwarding device 102 may be used as a collection device, that is, the forwarding device 102 is integrated with a collection function, and is configured to collect a header of a data packet forwarded by the forwarding device 102. In this scenario, the forwarding device 102 is connected to the management device 101 through a wired network or a wireless network.

In some embodiments, network traffic of the device 103 generally includes three parts: a heartbeat flow, a service flow, and an update flow.

The heartbeat flow includes a status flow and a keepalive flow. The status flow is used to periodically upload a status of the device, including version information, virus database information, and the like. The keepalive flow is used to periodically notify the service server that the device is in a powered-on and running state. A periodicity of the keepalive flow is interrupted as the service flow occurs. The heartbeat flow can reflect an essential feature of the device, and essential features of devices of different device types are usually different. Therefore, features of heartbeat flows (especially status flows) of the devices of different device types are usually different.

The service flow is a flow generated after some service operations are performed on the device. The ATM in the financial system is used as an example. A service flow generally occurs when a customer deposits or withdraws money or queries a service, and occurrence time is irregular. In the service flow, uplink traffic is small, and downlink traffic is smaller. In addition, a size of a data packet in the downlink traffic is fixed. The data packet in the downlink traffic is generally used to carry an "agree" or "disagree" instruction. Because the occurrence time of the service flow of the device is irregular, the service flow may be considered as background noise that reflects the essential feature of the device.

The update flow is usually generated when a version of the device is earlier. The service server compares information in the state flow sent by the device with latest version information and/or latest virus database information in the service server. Once the service server finds that the version of the device is earlier, the service server sends the latest version information and/or the latest virus database information to the device, to generate the update flow. Traffic of the update flow is usually large, and a data packet of the update flow is generally far greater than a data packet of the heartbeat flow and a data packet of the service flow.

Embodiments of this application provide a device identification method based on a feature that the heartbeat flow of the device can reflect the essential feature of the device. In this method, a device identification model is invoked to determine a device type of a to-be-identified device based on a network traffic feature of the to-be-identified device. A specific process may be: inputting the network traffic feature of the to-be-identified device to the device identification model, to obtain the device type that corresponds to the to-be-identified device and that is output by the device identification model. The device identification model is obtained through training based on network traffic features of a plurality of known devices of a known device type. In embodiments of this application, both the to-be-identified device and the known device may be IoT devices. A network traffic feature of a device may be determined based on data amounts of data packets that are of the device and that are collected within a plurality of periodicities.

In embodiments of this application, the network traffic feature of the to-be-identified device is determined based on data amounts of data packets that are of the to-be-identified device and that are collected within a plurality of periodicities, and then the device type of the to-be-identified device is determined based on the device identification model and the network traffic feature of the to-be-identified device. In a process of performing device identification on the device, the to-be-identified device does not need to report information (a banner) used to identify the to-be-identified device. Therefore, a service that is run on the to-be-identified device is not interrupted, and reliability of running the service by the to-be-identified device is high.

Figure 3:
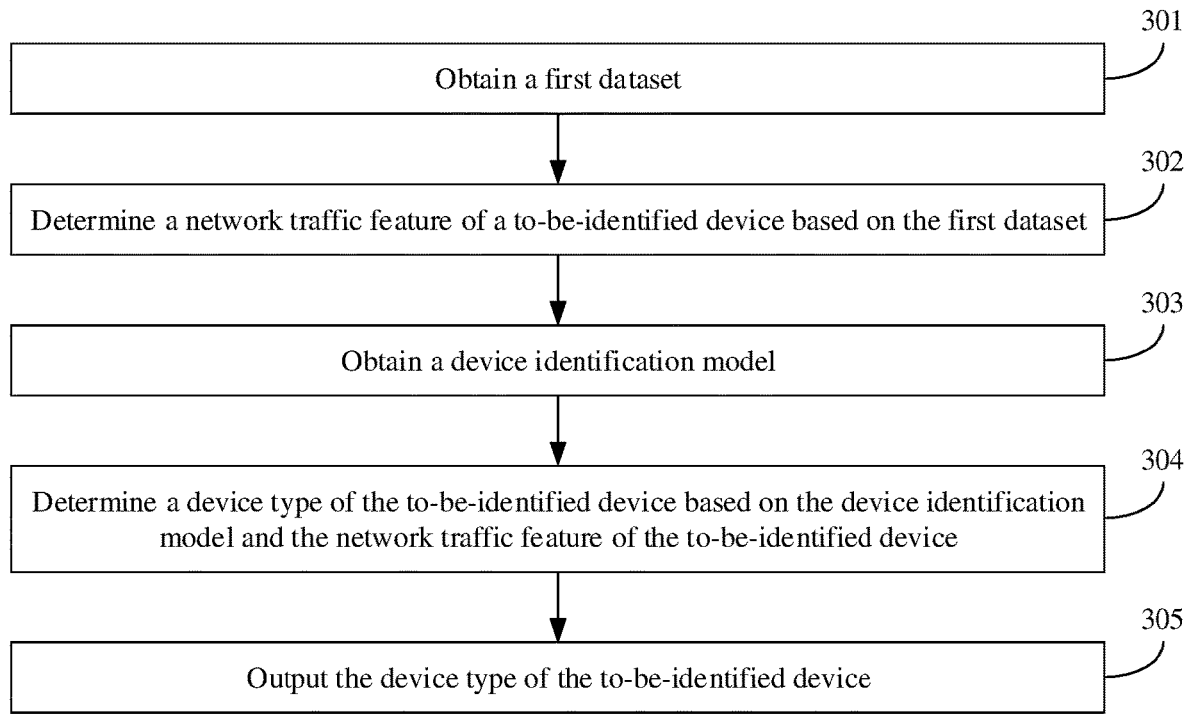
FIG. 3 is a schematic flowchart of a device identification method according to an embodiment of this application.

FIG. 3 is a schematic flowchart of a device identification method according to an embodiment of this application. The method may be applied to the management device 101 or the collection device 106 in the application scenario shown in FIG. 1, or may be applied to the management device 101 or the forwarding device 102 integrated with the collection function in the application scenario shown in FIG. 2. As shown in FIG. 3, the method includes the following steps.

Step 301: Obtain a first dataset.

The first dataset includes a plurality of pieces of first data, and each piece of first data includes a data amount of a data packet that is of a to-be-identified device and that is collected within one first periodicity, that is, the first dataset includes data amounts of data packets that are of the to-be-identified device and that are collected within a plurality of first periodicities. One first periodicity is one piece of unit duration. Optionally, the plurality of pieces of first data (namely, the first dataset) include data amounts of uplink data packets that are of the to-be-identified device and that are collected within the plurality of first periodicities and/or data amounts of downlink data packets that are of the to-be-identified device and that are collected within the plurality of first periodicities. For example, a value of duration of the first periodicity is 1 minute, the collection device collects two uplink data packets of the to-be-identified device within 1 minute, a size of one uplink data packet is 1000 bytes (B), and a size of the other uplink data packet is 1200 B. In this case, a data amount of the uplink data packets of the to-be-identified device within the 1 minute is 2200 B.

Figure 4:
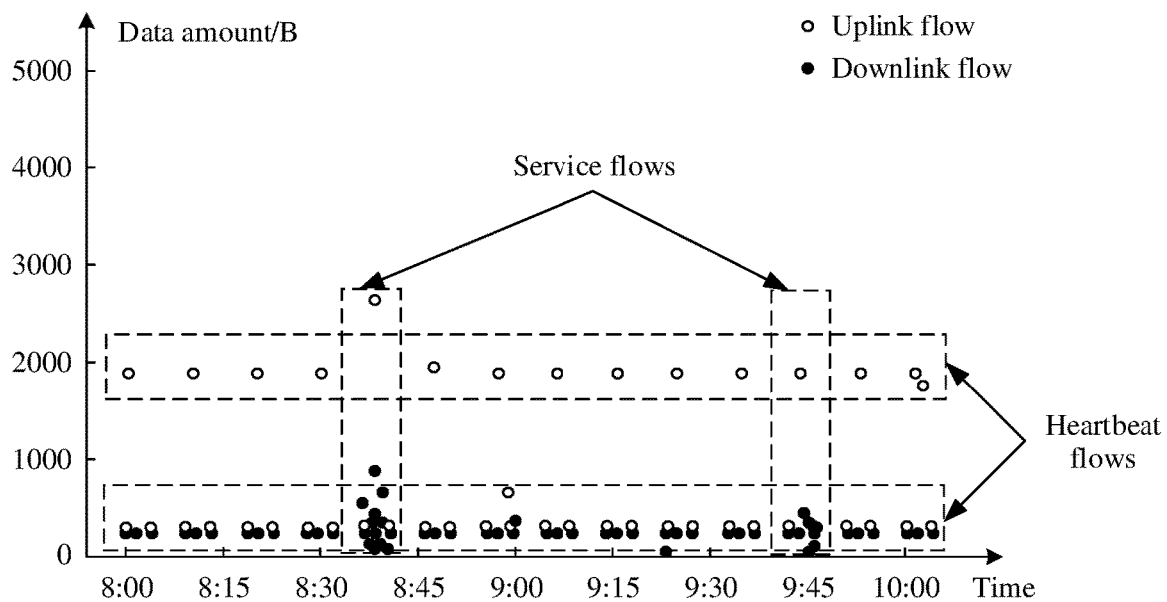
FIG. 4 is a traffic profile of an ATM within 2 hours according to an embodiment of this application.

For example, FIG. 4 is a traffic profile of an ATM within 2 hours according to an embodiment of this application. The traffic profile is generated based on data amounts of data packets of an ATM within a plurality of periodicities, and each point in FIG. 4 represents a data amount of a data packet of the ATM within one periodicity. A horizontal coordinate represents time, and a vertical coordinate represents a data amount in a unit of B. As shown in FIG. 4, an uplink flow of the ATM mainly aggregates at two levels: 300 B and 1800 B, and a downlink flow of the ATM mainly aggregates at a level: 200 B. Based on a feature of network traffic of the ATM, it can be learned that network traffic whose traffic size is stable and that has a periodicity is a heartbeat flow, and traffic with irregular occurrence time is a service flow. Traffic of an update flow is usually larger, which is not shown in FIG. 4.

In a $1^{st}$ optional embodiment of this application, Step 301 is performed by the management device. The following provides three implementations of obtaining the first dataset by the management device.

A first implementation includes the following step 3011A and step 3012A.

In step 3011A, the management device obtains headers of a plurality of data packets collected by the collection device that is in a first network and a moment at which the collection device collects the plurality of data packets.

The first network is a network accessed by the to-be-identified device. The data packet includes two parts: the header and data. The header of the data packet usually includes quintuple information and a packet length. The quintuple information includes a source Internet Protocol (IP) address, a destination IP address, a source port, a destination port, and a transport layer protocol. In other words, the header of the data packet may include the source IP address, the destination IP address, and the packet length. The header of the data packet in this embodiment of this application does not specifically refer to a complete header, and the header includes at least the source IP address, the destination IP address, and the packet length. If the collection device is a network probe, the moment at which the collection device collects the data packet may be a moment at which the collection device captures the data packet. If the collection device is a forwarding device, the moment at which the collection device collects the data packet may be a moment at which the forwarding device receives the data packet, or may be a moment at which the forwarding device forwards the data packet to another forwarding device or a service server.

Optionally, the management device may send a traffic collection instruction to the collection device that is in the first network. The traffic collection instruction is used to instruct the collection device to collect the header of the data packet in the first network. In this case, an implementation process of step 3011A includes: The management device receives the headers that are of the plurality of data packets and that are sent by the collection device that is in the first network and the moment at which the collection device collects the plurality of data packets. The traffic collection instruction may include a packet capture instruction and a sending instruction. The packet capture instruction is used to instruct the collection device to capture a header of a data packet within specified duration. For example, the packet capture instruction is used to instruct the collection device to capture content of first 100 bytes of a data packet forwarded within half a month. The content of the 100 bytes includes a source IP address, a destination IP address, and a packet length that are in a header. The sending instruction is used to instruct the collection device to send the captured header of the data packet to the management device within a service idle time period (for example, at night) or when storage space is insufficient. When the forwarding device integrates the collection function, the forwarding device sends the captured header of the data packet to the management device within the service idle time period. This does not affect normal forwarding of the data packet, and can ensure reliability of service running.

Optionally, the traffic collection instruction includes an identifier of the to-be-identified device, and the traffic collection instruction is used to instruct the collection device to collect a header of a data packet of the to-be-identified device. The identifier of the to-be-identified device may be an IP address of the to-be-identified device. The header of the data packet of the to-be-identified device includes the IP address of the to-be-identified device. The data packet of the to-be-identified device may include an uplink data packet of the to-be-identified device and/or a downlink data packet of the to-be-identified device. A source IP address in a header of the uplink data packet of the to-be-identified device is the IP address of the to-be-identified device. A destination IP address in a header of the downlink data packet of the to-be-identified device is the IP address of the to-be-identified device. If the traffic collection instruction includes the identifier of the to-be-identified device, the collection device that receives the traffic collection instruction may capture only the header of the data packet of the to-be-identified device and send the header to the management device. If the traffic collection instruction does not include the identifier of the to-be-identified device, the collection device that receives the traffic collection instruction may capture the headers of all the data packets and send the headers to the management device.

In this embodiment of this application, the management device can collect traffic of a single device by adding the identifier of the to-be-identified device to the traffic collection instruction, and then implement device identification of the single device in a directional manner.

Optionally, when the forwarding device integrates the collection function, the management device may first determine a forwarding device that is used to forward the data packet of the to-be-identified device and that is in the first network, and then send the traffic collection instruction to the forwarding device, to obtain a header of a data packet forwarded by the forwarding device. Alternatively, the management device may separately send the traffic collection instruction to each forwarding device that is in the first network, to obtain a header of a data packet forwarded by each forwarding device.

In this embodiment of this application, when the management device needs to perform asset counting on a device accessing the first network, that is, needs to separately perform device identification on each device accessing the first network, the management device can separately send the traffic collection instruction to each forwarding device that is in the first network, to obtain the header of the data packet forwarded by each forwarding device, and then separately identify a data packet of each device based on a source IP address and a destination IP address in the header of the data packet.

In step 3012A, the management device generates the first dataset based on the headers of the plurality of data packets and the moment at which the collection device collects the plurality of data packets.

Optionally, an implementation process of step 3012A includes: The management device counts the data amounts of the uplink data packets, that are of the to-be-identified device within the plurality of first periodicities, based on a packet length in a first header whose source IP address is the IP address of the to-be-identified device in the headers of the plurality of data packets and a moment at which the collection device collects a data packet in which the first header is located; and/or the management device counts the data amounts of the downlink data packets, that correspond to the to-be-identified device and that are within the plurality of first periodicities, based on a packet length in a second header whose destination IP address is the IP address of the to-be-identified device in the headers of the plurality of data packets and a moment at which the collection device collects a data packet in which the second header is located.

In this embodiment of this application, the management device only needs to obtain and parse the header of the data packet collected by the collection device and the moment at which the collection device collects the data packet, to count a data amount of a data packet that is of the to-be-identified device within each first periodicity. In a process of performing device identification on the to-be-identified device, data content of the data packet does not need to be parsed, so that security of the data in the data packet is high. For a scenario in which a financial system, for example, a bank, has a very high requirement on data privacy, the data part of the data packet may include information such as a financial account and a password of a user. In this embodiment of this application, the data part of the data packet does not need to be parsed. Therefore, requirements on data privacy and security can be well met.

Optionally, after obtaining the headers of the plurality of data packets collected by the collection device that is in the first network, the management device may obtain, through screening, a header of a data packet whose packet length is less than a target length threshold in the headers of the plurality of data packets. In this case, an implementation of step 3012A is: generating the first dataset based on a plurality of headers obtained through screening and a moment at which the collection device collects data packets in which the plurality of headers obtained through screening are located.

It can be learned from the foregoing content that network traffic of a device includes a heartbeat flow, a service flow, and an update flow, and correspondingly, a type of a data packet of the device is a heartbeat packet, a service packet, or an update packet. The heartbeat packet can reflect an essential feature of the device, and the update packet and the service packet may be considered as noise that reflects the essential feature of the device. A packet length of the heartbeat packet and a packet length of the service packet are generally shorter, and a length of the update packet is generally longer. In this embodiment of this application, a data packet with a longer packet length is screened out by setting the target length threshold, that is, an update packet in the data packet collected by the collection device is eliminated. This can better reflect a feature of the heartbeat packet, thereby improving device identification accuracy.

A second implementation includes the following step 3011B and step 3012B.

In step 3011B, the management device sends a statistical information collection instruction to the collection device in a first network. The statistical information collection instruction is used to instruct the collection device to count the data amounts of the data packets that are of the to-be-identified device and that are collected within the plurality of first periodicities.

Optionally, the statistical information collection instruction includes an identifier of the to-be-identified device. In this case, the statistical information collection instruction is used to instruct the collection device to count only the data amounts of the data packets that are of the to-be-identified device and that are collected within the plurality of first periodicities. Alternatively, the statistical information collection instruction does not include an identifier of the to-be-identified device. In this case, the statistical information collection instruction is used to instruct the collection device to separately count data amounts of data packets that are of each device and that are collected within the plurality of first periodicities. The statistical information collection instruction further includes duration of the first periodicity.

In step 3012B, the management device receives the plurality of pieces of first data sent by the collection device that is in the first network, to obtain the first dataset.

Optionally, after receiving the statistical information collection instruction, in response to the data amounts, instructed by the statistical information collection instruction to be counted, of the data packets that are of the to-be-identified device and that are collected within the plurality of first periodicities, the collection device counts the data amounts of the data packets, that are of the to-be-identified device within the plurality of first periodicities, based on headers of a plurality of collected data packets of the to-be-identified device and the collection moments of the plurality of data packets, to obtain the plurality of pieces of first data, and sends the plurality of first data to the management device.

For example, the value of the duration of the first periodicity is 1 minute, the collection device collects two uplink data packets of the to-be-identified device within 1 minute (one first periodicity) from 8:00 to 8:01, a size of one uplink data packet is 1000 B, a size of the other uplink data packet is 1200 B, and the collection device counts a data amount, that is 2200 B, of the uplink data packets that are of the to-be-identified device within the first periodicity. In this case, one piece of first data sent by the collection device to the management device may be represented as {8:00-8:01; 2200 B}.

A third implementation includes the following step 3011C to step 3013C.

In step 3011C, the management device sends a statistical information collection instruction to the collection device that is in a first network. The statistical information collection instruction is used to instruct the collection device to count data amounts of data packets that are of the to-be-identified device and that are collected at a plurality of collection moments.

Optionally, the statistical information collection instruction includes an identifier of the to-be-identified device. In this case, the statistical information collection instruction is used to instruct the collection device to count only the data amounts of the data packets that are of the to-be-identified device and that are collected at the plurality of collection moments. Alternatively, the statistical information collection instruction does not include an identifier of the to-be-identified device. In this case, the statistical information collection instruction is used to instruct the collection device to separately count data amounts of data packets that are of each device and that are collected at the plurality of collection moments.

In step 3012C, the management device receives a plurality of pieces of second data sent by the collection device that is in the first network. Each piece of second data includes one collection moment and a data amount of a data packet that is of the to-be-identified device and that is collected at the collection moment.

Optionally, after receiving the statistical information collection instruction, in response to the data amounts, instructed by the statistical information collection instruction to be counted, of the data packets that are of the to-be-identified device and that are collected at the plurality of collection moments, the collection device counts the data amounts of the data packets, that are of the to-be-identified device at the plurality of collection moments, based on headers of a plurality of collected data packets of the to-be-identified device and the collection moments of the plurality of data packets, to obtain the plurality of pieces of second data, and sends the plurality of second data to the management device.

For example, the collection device collects two uplink data packets of the to-be-identified device at 8:00, a size of one uplink data packet is 100 B, and a size of the other uplink data packet is 1200 B; and the collection device collects other two uplink data packets of the to-be-identified device at 8:01, and sizes of the two uplink data packets are both 1000 B. The collection device counts data amounts, that are respectively 1300 B and 2000 B, of the data packets collected at the two collection moments. In this case, two pieces of second data sent by the collection device to the management device may be represented as {8:00→1300 B; 8:01→2000 B}.

In step 3013C, the management device generates the first dataset based on the plurality of pieces of second data.

For example, the value of the duration of the first periodicity is 1 minute. Refer to the example in step 3012C. The management device obtains, through counting based on the plurality of pieces of second data sent by the collection device, that a data amount of uplink data packets of the to-be-identified device within 1 minute (one first periodicity) from 8:00 to 8:01 is 3300 B, that is, obtains, through counting, that one piece of first data is {8:00-8:01; 3300 B}.

In the second implementation and the third implementation, the management device can distinguish, by adding different indications to the statistical information collection instruction, whether the statistical information collection instruction is used to instruct the collection device to count the data amounts of the data packets that are of the to-be-identified device and that are collected within the plurality of first periodicities, or is used to instruct the collection device to count the data amounts of the data packets that are of the to-be-identified device and that are collected at the plurality of collection moments. For example, when an indicator bit of the statistical information collection instruction is set to 0, it indicates that the statistical information collection instruction is used to instruct the collection device to count the data amounts of the data packets that are of the to-be-identified device and that are collected within the plurality of first periodicities. When an indicator bit of the statistical information collection instruction is set to 1, it indicates that the statistical information collection instruction is used to instruct the collection device to count the data amounts of the data packets that are of the to-be-identified device and that are collected at the plurality of collection moments.

In a $2^{nd}$ optional embodiment of this application, step 301 is performed by the collection device. For an implementation in which the collection device obtains the first dataset, refer to the first implementation (step 3011A and step 3012A) in which the management device obtains the first dataset. Details are not described herein again in this embodiment of this application.

Step 302: Determine a network traffic feature of the to-be-identified device based on the first dataset.

The network traffic feature of the to-be-identified device can reflect an essential feature of the to-be-identified device. The network traffic feature of the to-be-identified device includes a data amount distribution feature corresponding to the to-be-identified device, and/or a data amount frequency-domain feature corresponding to the to-be-identified device. The data amount frequency-domain feature includes a frequency and/or an amplitude of a data amount time series. Optionally, an implementation process of step 302 includes the following step 3021 and step 3022.

In step 3021, a first data amount time series $(T_n, S_n)$ corresponding to the to-be-identified device is generated based on the first dataset.

$T_n$ represents an $n^{th}$ first periodicity, $S_n$ represents a data amount of a data packet that is of the to-be-identified device and that is collected within the $n^{th}$ first periodicity, and n is a positive integer. For example, the traffic profile of the ATM shown in FIG. 4 reflects a data amount time series of the ATM. Each point in a coordinate system represents a data amount of a data packet that is of the ATM and that is collected within one periodicity, and all the points in the coordinate system constitutes the data amount time series corresponding to the ATM within the 2 hours.

Optionally, the first data amount time series corresponding to the to-be-identified device includes an uplink data amount time series and/or a downlink data amount time series corresponding to the to-be-identified device. An implementation process of step 3021 includes: in response to a case that the plurality of pieces of first data includes the data amounts of the uplink data packets that are of the to-be-identified device and that are collected within the plurality of first periodicities, generating, based on the first dataset, the uplink data amount time series corresponding to the to-be-identified device; and/or in response to a case that the plurality of pieces of first data include the data amounts of the downlink data packets that are of the to-be-identified device and that are collected within the plurality of first periodicities, generating, based on the first dataset, the downlink data amount time series corresponding to the to-be-identified device. For example, in the traffic profile of the ATM shown in FIG. 4, a data amount time series (namely, an uplink data amount time series) corresponding to an uplink flow of the ATM within the 2 hours and a data amount time series (namely, a downlink data amount time series) corresponding to a downlink flow of the ATM within the 2 hours are separately shown.

In step 3022, the network traffic feature of the to-be-identified device is determined based on the first data amount time series ($T_n$, $S_n$).

Optionally, an implementation process of step 3022 includes: determining, based on the first data amount time series ($T_n$, $S_n$), the data amount distribution feature corresponding to the to-be-identified device; and/or performing a frequency-domain change on the first data amount time series ($T_n$, $S_n$) to obtain the data amount frequency-domain feature corresponding to the to-be-identified device, where the data amount frequency-domain feature includes the frequency and/or the amplitude of the first data amount time series ($T_n$, $S_n$). Optionally, the frequency-domain change may be performed on the first data amount time series ($T_n$, $S_n$) by using Fourier transform, to obtain the data amount frequency-domain feature corresponding to the to-be-identified device. Alternatively, the frequency-domain change may be performed on the first data amount time series ($T_n$, $S_n$) in another frequency-domain transform manner. This is not limited in this embodiment of this application.

Figure 5:
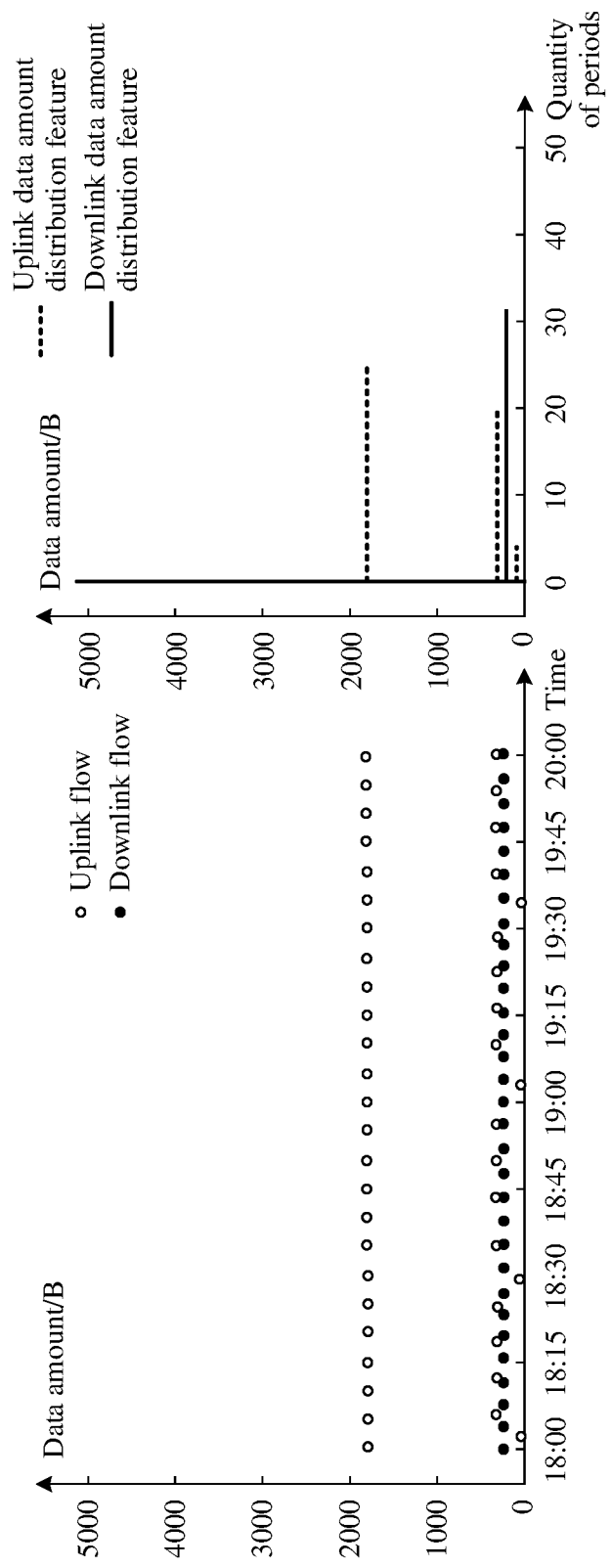
FIG. 5 shows a data amount time series and a data amount distribution feature that correspond to an ATM according to an embodiment of this application.

For example, FIG. 5 shows a data amount time series and a data amount distribution feature that correspond to an ATM within 2 hours according to an embodiment of this application. A left figure shows the data amount time series corresponding to the ATM within the 2 hours, a right figure shows the data amount distribution feature corresponding to the ATM within the 2 hours, and a horizontal coordinate in the right figure is a quantity of periodicities obtained through counting based on data amounts in the left figure. It can be learned from FIG. 5 that a periodicity of an uplink data amount time series corresponding to the ATM (an uplink periodicity for short) is 5 minutes, and an amplitude of the uplink data amount time series corresponding to the ATM (an uplink amplitude for short) is 1800 B. A periodicity of a downlink data amount time series corresponding to the ATM (a downlink periodicity for short) is 4 minutes, and an amplitude of the downlink data amount time series corresponding to the ATM (a downlink amplitude for short) is 200 B.

Figure 6:
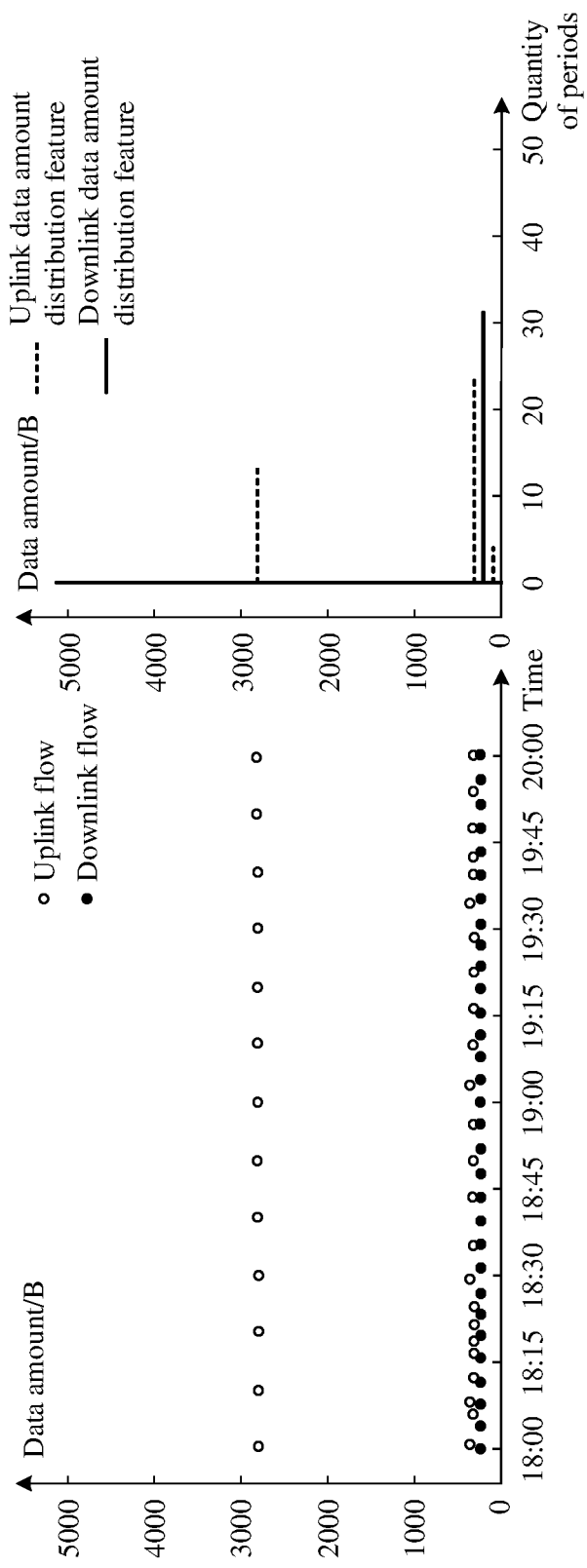
FIG. 6 shows a data amount time series and a data amount distribution feature that correspond to a card issuer according to an embodiment of this application.

For another example, FIG. 6 shows a data amount time series and a data amount distribution feature that correspond to a card issuer within 2 hours according to an embodiment of this application. A left figure shows the data amount time series corresponding to the card issuer within the 2 hours, and a right figure shows the data amount distribution feature corresponding to the card issuer within the 2 hours. It can be learned from FIG. 6 that an uplink periodicity corresponding to the card issuer is 10 minutes, and an uplink amplitude corresponding to the card issuer is 2800 B. A downlink periodicity corresponding to the card issuer is 4 minutes, and a downlink amplitude corresponding to the card issuer is 200 B.

It can be learned from FIG. 5 and FIG. 6 that periodicities and amplitudes of data amount distribution features and data amount time series that correspond to devices of different device types are usually different, that is, network traffic features of the devices of different device types are different.

Optionally, the network traffic feature of the to-be-identified device may be represented by using a one-dimensional vector, and may be specifically represented as [uplink data amount distribution feature; uplink periodicity; uplink amplitude; downlink data amount distribution feature; downlink periodicity; downlink amplitude]. For example, a range of a data amount within a statistical periodicity of the management device or the collection device is 0 to 5000 B. The 5000 B is divided into 500 dimensions equally proportionally, and each dimension corresponds to a range of 10 B. The uplink data amount distribution feature and the downlink data amount distribution feature are separately represented by using the 500 dimensions. A value of each dimension indicates a quantity of periodicities within which a corresponding data amount is in a range of 10 B corresponding to the dimension. A value of a $1^{st}$ dimension corresponding to the uplink data amount distribution feature indicates a quantity of periodicities within which a corresponding data amount is in a range of 0 to 10 B. It is assumed that the uplink periodicity corresponding to the to-be-identified device is 5 minutes, the uplink amplitude corresponding to the to-be-identified device is 1800 B, the downlink periodicity corresponding to the to-be-identified device is 4 minutes, and the downlink amplitude corresponding to the to-be-identified device is 200 B. In this case, the network traffic feature of the to-be-identified device may be represented as a one-dimensional vector with 1004 dimensions. $1^{st}$ to $500^{th}$ dimensions represent the uplink data amount distribution feature, a $501^{st}$ dimension represents the uplink periodicity, and a $502^{nd}$ dimension represents the uplink amplitude:

[0, 0,0,0,0,0,6,0,0,0,0,0,1,0,0,0,0,0,4,0,0,0,0,1,0,19,0,0, 0,0,0,0,0,0,0,0,0,0,0,0, 0,0,0,0,0,0,0,0,0,0,0,0,0,0,0,0, 0,0,0,0,0,0,0,0,0,0,0,0,0,0,0,0,0,0,0,0,0,0,0,0,0,0, 0,0,0,0,0,0,0,0,0,0,0,0,0,0,0,0,0,0,0,0,0,0,0,0,0,0, 0,0,0,0,0,0,0,0,0,0,0,0,0,0, 0,0,0,0,0,0,0,0,0,0,0,0, 0,0,0,0,0,0,0,0,0,0,0,0,0,0,0,0,0,0,0,1,0,0,0,0,0,5, 0, 0,0,0,0,4,0,0,0,0,0,0,0,0,0,0,0,0,0,0,0,0,0,0,0,0, 0,0,0,0,0,0,0,0,0,0,0,0,0,0,0, 0,0,0,0,0,0,0,0,0,0,0,0, 0,0,0,0,0,0,0,0,0,0,0,0,0,0,0,0,0,0,0,0,0,0,0,0,0,0, 0,0,0, 0,0,0,0,0,0,0,0,0,0,0,0,0,0,0,0,0,0,0,0,0,0,0, 0,0,0,0,0,0,0,0,0,0,0,0,0,0,0,0, 0,0,0,0,0,0,0,0,0,0, 0,0,0,0,0,0,0,0,0,0,0,0,0,0,0,0,0,0,0,0,0,0,0,0,0,0, 0,0,0,0,0, 0,0,0,0,0,0,0,0,0,0,0,0,0,0,0,0,0,0,0,0, 0,0,0,0,0,0,0,0,0,0,0,0,0,0,0,0, 0,0,0,0,0,0,0,0,0,0, 0,0,0,0,0,0, 0,0,0,0,0,0,0,0,0,0,0,0,0,0,0,0,0,0,0, 0,0; 5; 1800; 0,0,0,0,0,0,4,0,0,0,0,0,3,0,0,0,0,0, 0,29,0,0,0, 0,0,0,0,0,0,0,0,0,0,0,0,0,0,0,0,0,0,0,0,0,0,0,0,0,0,0, 0,0,0,0,0,0,0,0,0, 0,0,0,0,0,0,0,0,0,0,0,0,0,0,0,0, 0,0,0,0,0,0,0,0,0,0,0,0,0,0,0,0,0,0,0,0,0, 0,0,0,0, 0,0,0,0,0,0,0,0,0,0,0,0,0,0,0,0,0,0,0,0,0,0,0,0,0,0, 0,0,0,0,0,0,0,0,0,0,0, 0,0,0,0,0,0,0,0,0,0,0,0,0,0,0, 0,0,0,0,0,0,0,0,0,0,0,0,0,0,0,0,0,0,0,0,0,0,0,0, 0,0, 0,0,0,0,0,0,0,0,0,0,0,0,0,0,0,0,0,0,0,0,0,0,0,0,0,0, 0,0,0,0,0,0,0,0,0,0,0,0, 0,0,0,0,0,0,0,0,0,0,0,0,0,0, 0,0,0,0,0,0,0,0,0,0,0,0,0,0,0,0,0,0,0,0,0,0, 0,0,0,0,0,0,0,0,0,0,0,0,0,0,0,0,0,0,0,0,0,0,0,0,0,0, 0,0,0,0,0,0,0,0,0,0,0,0,0, 0,0,0,0,0,0,0,0,0,0,0,0, 0,0,0,0,0,0,0,0,0,0,0,0,0,0,0,0,0,0,0,0,0,0,0,0,0, 0, 0,0,0,0,0,0,0,0,0,0,0,0,0,0,0,0,0,0,0,0,0,0,0,0,0, 0,0,0,0,0,0,0,0,0,0,0,0,0,0,0, 0,0,0,0,0,0,0,0,0,0,0, 0,0,0,0,0,0,0,0,0,0,0,0,0,0,0,0,0,0,0,0,0,0,0,0,0,0, 0,0,0, 0,0,0; 4; 200].

Step 303: Obtain a device identification model.

The device identification model is obtained through training based on network traffic features of a plurality of known devices of a known device type.

In a $1^{st}$ optional embodiment of this application, if a device that trains the device identification model and a device that uses the device identification model are a same device, an implementation process of step 303 includes the following step 3031 and step 3032.

In step 3031, a network traffic feature of a known device is determined based on a second dataset. The second dataset includes a plurality of pieces of third data, and each piece of third data includes a data amount of a data packet that is of the known device and that is collected within one second periodicity.

Optionally, an implementation process of step 3031 includes: generating, based on the second dataset, a second data amount time series $(T_m, S_m)$ corresponding to the known device, where $T_m$ represents an $m^{th}$ second periodicity, $S_m$ represents a data amount of a data packet that is of the known device and that is collected within the $m^{th}$ second periodicity, and m is a positive integer; and determining the network traffic feature of the known device based on the second data amount time series $(T_m, S_m)$. Optionally, an implementation process of determining the network traffic feature of the known device based on the second data amount time series $(T_m, S_m)$ may include: determining, based on the second data amount time series $(T_m, S_m)$, a data amount distribution feature corresponding to the known device; and/or performing a frequency-domain change on the second data amount time series $(T_m, S_m)$ to obtain a data amount frequency-domain feature corresponding to the known device, where the data amount frequency-domain feature includes a frequency and/or an amplitude of the second data amount time series $(T_m, S_m)$. For a specific implementation process of step 3031, refer to an implementation of determining the network traffic feature of the to-be-identified device in step 302. Details are not described herein again in this embodiment of this application.

Optionally, before step 3031 is performed, headers of a plurality of data packets collected by a collection device that is in a second network and a moment at which the collection device collects the plurality of data packets are first obtained. Then, a header of a data packet of the known device is obtained from the headers of the plurality of data packets based on prior information. Finally, the second dataset is generated based on a packet length in the header of the data packet of the known device and a moment at which the collection device collects the data packet of the known device. For an implementation process of obtaining the headers of the plurality of data packets collected by the collection device that is in the second network and the moment at which the collection device collects the plurality of data packets, refer to related descriptions in step 3011A. For an implementation process of generating the second dataset based on the packet length in the header of the data packet of the known device and the moment at which the collection device collects the data packet of the known device, refer to related description in step 3012A. Details are not described herein again in this embodiment of this application.

The second network is a network accessed by the known device. Optionally, a device type of a device served by the second network includes all device types of a device served by the first network (the network to which the to-be-identified device accesses), that is, a device type of a device accessing the second network includes all device types of the device accessing the first network. For example, both the second network and the first network serve a bank in a financial system, and the device type of the device served by the second network and the device type of the device served by the first network each include an ATM, a self-service query terminal, a card issuer, a smart counter, a surveillance camera, and the like. The second network and the first network may be a same network, or may be different networks.

The prior information includes a plurality of device types and identifiers of a plurality of known devices corresponding to each of the device types. The identifier of the known device may be an IP address of the known device. The plurality of device types included in the prior information may include all the device types of the device accessing the second network, and the prior information may include all device types that may correspond to the to-be-identified device. In addition, the prior information may include identifiers of as many known devices as possible corresponding to each device type, to provide sufficient samples for model training, so that inference accuracy of the model obtained through training is high. The prior information may be information input externally. For example, the user may input the prior information by using a user interface on a display device, then the display device sends the prior information to the management device, and finally the management device trains the device identification model based on the prior information.

In this embodiment of this application, the device identification model may be obtained through training by the management device. Certainly, a possibility that the collection device or another device obtains the device identification model through training is not excluded. Optionally, when the second network and the first network are a same network, the management device may collect the header of the data packet of the to-be-identified device and the header of the data packet of the known device at the same time, and obtain, through screening, the header of the data packet of the known device based on the prior information. An unknown device accessing the network may be considered as a to-be-identified device.

In step 3032, the device identification model is generated based on the network traffic features of the plurality of known devices and device types of the plurality of known devices.

Optionally, the device identification model is obtained, by using a supervised learning algorithm, through training based on the network traffic features of the plurality of known devices and the device types of the plurality of known devices. The device identification model is a machine learning model, for example, may be a deep neural network or a decision tree. A type of the device identification model is not limited in this embodiment of this application.

In a $2^{nd}$ optional embodiment of this application, if a device that trains the device identification model and a device that uses the device identification model are different devices, an implementation process of step 303 includes: receiving a device identification model from another device or platform. In other words, the device identification model may be from the another device or platform, that is, the device identification model is generated by the another device or platform and then sent to the management device or the collection device. For a process of generating the device identification model by the another device or platform, refer to related descriptions of generating the device identification model in the $1^{st}$ optional embodiment. Details are not described in this embodiment of this application again.

Step 304: Determine a device type of the to-be-identified device based on the device identification model and the network traffic feature of the to-be-identified device.

An implementation process of step 304 includes: inputting the network traffic feature of the to-be-identified device to the device identification model, to obtain the device type that is of the to-be-identified device and that is output by the device identification model.

In this embodiment of this application, the device identification model is invoked to determine the device type of the to-be-identified device based on the network traffic feature of the to-be-identified device. In a process of performing device identification on a device, the to-be-identified device does not need to report information used to identify the to-be-identified device. Therefore, a service that is run on the to-be-identified device is not interrupted, and reliability of running the service by the to-be-identified device is high.

Optionally, after the device type of the to-be-identified device is determined, the following step 305 may be further performed.

Step 305: Output the device type of the to-be-identified device.

Optionally, when step 304 is performed by the management device, the management device outputs the device type of the to-be-identified device, which may be that the management device sends, to the display device, the device type corresponding to the to-be-identified device, so that the display device displays the device type of the to-be-identified device. This helps the user view the device type. When step 304 is performed by the collection device, the collection device outputs the device type corresponding to the to-be-identified device, which may be that the collection device sends, to the management device, the device type corresponding to the to-be-identified device, and then the management device sends the device type of the to-be-identified device to the display device, so that the display device displays the device type corresponding to the to-be-identified device. This helps the user view the device type.

Further, the user may further verify a device identification result of the to-be-identified device. If the user determines that the device type corresponding to the to-be-identified device is correct, the user sends a confirmation instruction to the management device by using the user interface. If the user determines that the device type corresponding to the to-be-identified device is incorrect, the user sends an identification error instruction to the management device by using the user interface and inputs a correct classification result.

Optionally, after the device type of the to-be-identified device is determined, a model training device may further retrain the device identification model based on the device type of the to-be-identified device and the network traffic feature of the to-be-identified device, to update and optimize the device identification model, so as to improve reliability and robustness of the device identification model. For example, after completing verification of the device identification result of the to-be-identified device, the user may trigger the model training device to update and optimize the device identification model based on a verified device type of the to-be-identified device and the network traffic feature of the to-be-identified device.

The device identification method provided in this embodiment of this application may be alternatively used to implement asset counting on all devices in a network. For example, in the application scenario shown in FIG. 1, the user manipulates the management device 101 by using the user interface of the display device 105, to send a traffic collection instruction to the forwarding device 102 in the network. The forwarding device 102 sends a header of a data packet forwarded by the forwarding device 102 to the management device 101. The management device 101 extracts a network traffic feature of each device (one device corresponds to one IP address) based on a source IP address, a destination IP address, and a packet length that are in the header of the data packet. The user inputs prior information by using the user interface of the display device 105, and sends the prior information to the management device 101. The prior information includes device types of all devices that need to be counted, and as many IP addresses as possible corresponding to each device type. The management device 101 obtains, through screening, a known device in all the devices based on the prior information, and performs supervised-learning model training by using a network traffic feature of the known device and a device type corresponding to the known device, to obtain a device identification model. Then, the management device 101 separately inputs a network traffic feature of an unknown device to the device identification model, to obtain a device type that corresponds to the unknown device and that is output by the device identification model, to complete asset counting of the device that is in the entire network.

To improve model robustness, after the management device 101 sends an asset counting list to the display device and presents the asset counting list on the user interface, the user may randomly select some assets for verification. The management device 101 may perform model retraining and inference based on an asset verification result, to obtain a more reliable asset counting result.

In this embodiment of this application, a small-sample semi-supervised manner is used. The user only needs to provide all device types of the device that is in the network and a part of IP addresses corresponding to each device type, to count all IP addresses (namely, all devices) corresponding to all the device types in the network. This solution has high implementability.

A sequence of steps of the device identification method provided in this embodiment of this application may be appropriately adjusted, or steps may be correspondingly added or deleted as required. Any variation method readily figured out by a person skilled in the art within the technical scope disclosed in this application shall fall within the protection scope of this application. Therefore, details are not described herein.

In conclusion, in the device identification method provided in this embodiment of this application, the network traffic feature of the to-be-identified device is determined based on data amounts of the data packets that are of the to-be-identified device and that are collected by the collection device within the plurality of periodicities, and then the device identification model is invoked to determine the device type of the to-be-identified device based on the network traffic feature of the to-be-identified device. In the process of performing device identification on the device, the to-be-identified device does not need to report the information used to identify the to-be-identified device. Therefore, the service that is run on the to-be-identified device is not interrupted, and reliability of running the service by the to-be-identified device is high. In addition, only the header of the data packet collected by the collection device and the moment at which the collection device collects the data packet need to be obtained and parsed, to count the data amount of the data packet that is of the to-be-identified device within each first periodicity. In the process of performing device identification on the to-be-identified device, the data content of the data packet does not need to be parsed, so that security of the data in the data packet is high. In this embodiment of this application, the small-sample semi-supervised manner is used. The user only needs to provide all the device types of the device that is in the network and a part of IP addresses corresponding to each device type, to count all the IP addresses (namely, all the devices) corresponding to all the device types in the network. This solution has high implementability.

Figure 7:
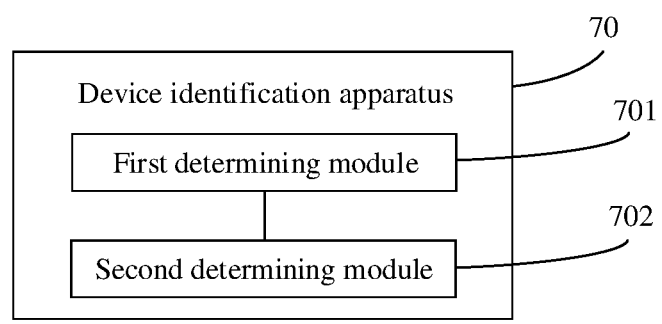
FIG. 7 is a schematic diagram of a structure of a device identification apparatus according to an embodiment of this application.

FIG. 7 is a schematic diagram of a structure of a device identification apparatus according to an embodiment of this application. The device identification apparatus may be the management device 101 or the collection device 106 in the application scenario shown in FIG. 1, or may be the management device 101 or the forwarding device 102 integrated with the collection function in the application scenario shown in FIG. 2. As shown in FIG. 7, the apparatus 70 includes a first determining module 701 and a second determining module 702.

The first determining module 701 is configured to determine a network traffic feature of a to-be-identified device based on a first dataset. The first dataset includes a plurality of pieces of first data, and each piece of first data includes a data amount of a data packet that is of the to-be-identified device and that is collected within one first periodicity. For a specific implementation process, refer to detailed descriptions of step 302 in the embodiment shown in FIG. 3. Details are not described herein again.

The second determining module 702 is configured to determine a device type of the to-be-identified device based on a device identification model and the network traffic feature of the to-be-identified device. For a specific implementation process, refer to detailed descriptions of step 303 in the embodiment shown in FIG. 3. Details are not described herein again.

Optionally, the first determining module 701 is configured to: generate, based on the first dataset, a first data amount time series $(T_n, S_n)$ corresponding to the to-be-identified device, where $T_n$ represents an $n^{th}$ first periodicity, $S_n$ represents a data amount of a data packet that is of the to-be-identified device and that is collected within the $n^{th}$ first periodicity, and n is a positive integer; and determine the network traffic feature of the to-be-identified device based on the first data amount time series $(T_n, S_n)$. For a specific implementation process, refer to detailed descriptions of step 3021 and step 3022 in the foregoing embodiment. Details are not described herein again.

Optionally, the first determining module 701 is configured to: determine, based on the first data amount time series $(T_n, S_n)$, a data amount distribution feature corresponding to the to-be-identified device; and/or perform a frequency-domain change on the first data amount time series $(T_n, S_n)$ to obtain a data amount frequency-domain feature corresponding to the to-be-identified device, where the data amount frequency-domain feature includes a frequency and/or an amplitude of the first data amount time series $(T_n, S_n)$. For a specific implementation process, refer to detailed descriptions of step 3022 in the foregoing embodiment. Details are not described herein again.

Optionally, the first determining module 701 is configured to: in response to a case that the plurality of pieces of first data include data amounts of uplink data packets that are of the to-be-identified device and that are collected within a plurality of first periodicities, generate, based on the first dataset, an uplink data amount time series corresponding to the to-be-identified device; and/or in response to a case that the plurality of pieces of first data include data amounts of downlink data packets that are of the to-be-identified device and that are collected within a plurality of first periodicities, generate, based on the first dataset, a downlink data amount time series corresponding to the to-be-identified device. For a specific implementation process, refer to detailed descriptions of step 3021 in the foregoing embodiment. Details are not described herein again.

Figure 8:
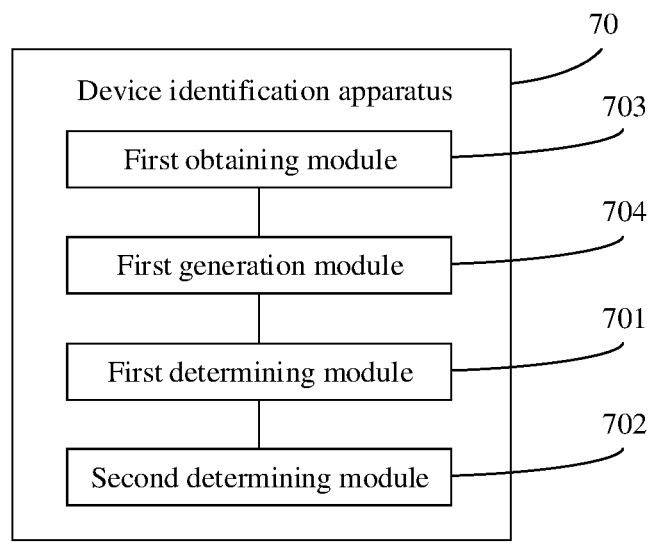
FIG. 8 is a schematic diagram of a structure of another device identification apparatus according to an embodiment of this application.

Optionally, as shown in FIG. 8, the apparatus 70 further includes a first obtaining module 703 and a first generation module 704. The first obtaining module 703 is configured to obtain headers of a plurality of data packets collected by a collection device that is in a first network and a moment at which the collection device collects the plurality of data packets. The headers each include a source IP address, a destination IP address, and a packet length, and the first network is a network accessed by the to-be-identified device. For a specific implementation process, refer to detailed descriptions of step 3011A in the foregoing embodiment. Details are not described herein again. The first generation module 704 is configured to generate the first dataset based on the headers of the plurality of data packets and the moment at which the collection device collects the plurality of data packets. For a specific implementation process, refer to detailed descriptions of step 3012A in the foregoing embodiment. Details are not described herein again.

Optionally, the first generation module 704 is configured to: count the data amounts of the uplink data packets, that are of the to-be-identified device within the plurality of first periodicities, based on a packet length in a first header whose source IP address is an IP address of the to-be-identified device in the headers of the plurality of data packets and a moment at which the collection device collects a data packet in which the first header is located; and/or count the data amounts of the downlink data packets, that are of the to-be-identified device within the plurality of first periodicities, based on a packet length in a second header whose destination IP address is an IP address of the to-be-identified device in the headers of the plurality of data packets and a moment at which the collection device collects a data packet in which the second header is located. For a specific implementation process, refer to detailed descriptions of step 3012A in the foregoing embodiment. Details are not described herein again.

Figure 9:
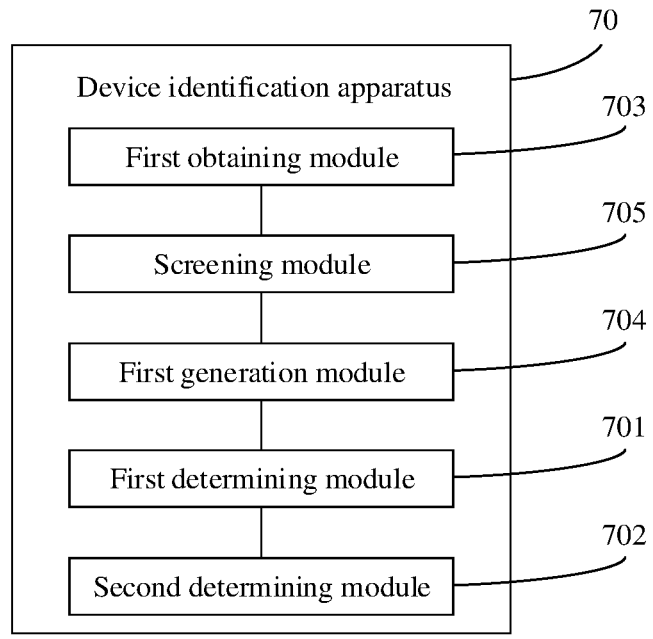
FIG. 9 is a schematic diagram of a structure of still another device identification apparatus according to an embodiment of this application.

Optionally, as shown in FIG. 9, the apparatus 70 further includes a screening module 705, configured to obtain, through screening, a header of a data packet whose packet length is less than a target length threshold in the headers of the plurality of data packets. The first generation module 704 is configured to generate the first dataset based on a plurality of headers obtained through screening and a moment at which the collection device collects data packets in which the plurality of headers obtained through screening are located. For a specific implementation process, refer to detailed descriptions of step 3012A in the foregoing embodiment. Details are not described herein again.

Figure 10:
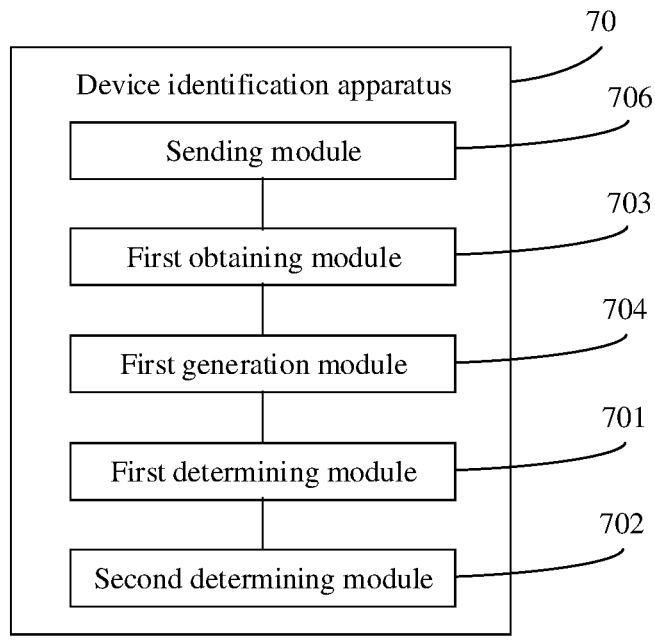
FIG. 10 is a schematic diagram of a structure of yet another device identification apparatus according to an embodiment of this application.

Optionally, when the apparatus 70 is a management device, as shown in FIG. 10, the apparatus 70 further includes a sending module 706, configured to send a traffic collection instruction to the collection device that is in the first network. The traffic collection instruction is used to instruct the collection device to collect a header of a data packet in the first network. The first obtaining module 703 is configured to receive the headers that are of the plurality of data packets and that are sent by the collection device that is in the first network and the moment at which the collection device collects the plurality of data packets. For a specific implementation process, refer to detailed descriptions of step 3011A in the foregoing embodiment. Details are not described herein again.

Optionally, the traffic collection instruction includes an identifier of the to-be-identified device, and the traffic collection instruction is used to instruct the collection device to collect a header of a data packet of the to-be-identified device. For a specific implementation process, refer to detailed descriptions of step 3011A in the foregoing embodiment. Details are not described herein again.

Figure 11:
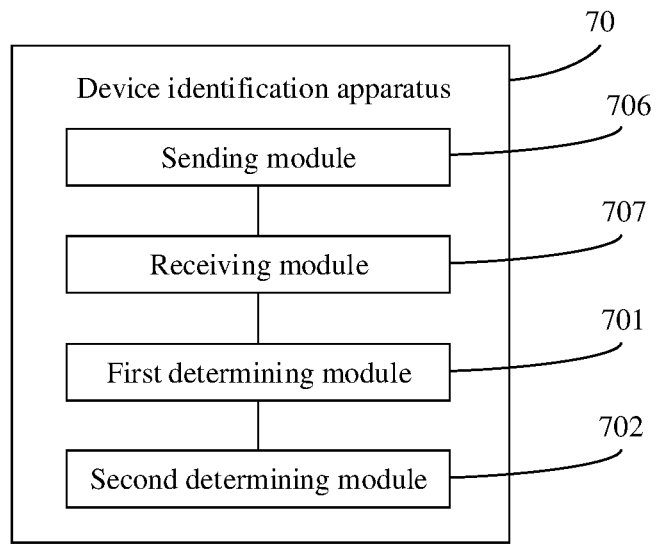
FIG. 11 is a schematic diagram of a structure of yet still another device identification apparatus according to an embodiment of this application.

Optionally, when the apparatus 70 is a management device, as shown in FIG. 11, the apparatus 70 further includes a sending module 706, configured to send a statistical information collection instruction to a collection device that is in a first network; and a receiving module 707, configured to: in response to a case that the statistical information collection instruction instructs the collection device to count data amounts of data packets that are of the to-be-identified device and that are collected within the plurality of first periodicities, receive the plurality of pieces of first data sent by the collection device that is in the first network, to obtain the first dataset. For a specific implementation process, refer to detailed descriptions of step 3011B and step 3012B in the foregoing embodiment. Details are not described herein again. Alternatively, the receiving module 707 is configured to: in response to a case that the statistical information collection instruction instructs the collection device to count data amounts of data packets that are of the to-be-identified device and that are collected at a plurality of collection moments, receive a plurality of pieces of second data sent by the collection device that is in the first network, and generate the first dataset based on the plurality of pieces of second data. Each piece of second data includes one collection moment and a data amount of a data packet that is of the to-be-identified device and that is collected at the collection moment. For a specific implementation process, refer to detailed descriptions of step 3011C to step 3013C in the foregoing embodiment. Details are not described herein again.

Optionally, the to-be-identified device is an IoT device.

Figure 12:
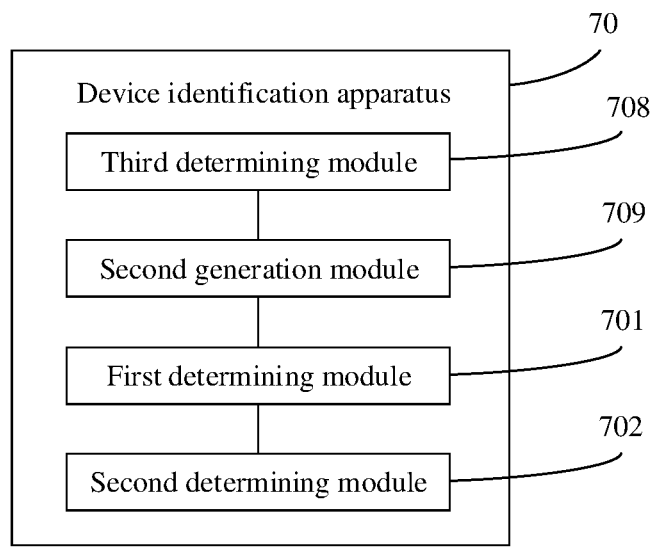
FIG. 12 is a schematic diagram of a structure of a device identification apparatus according to another embodiment of this application.

Optionally, as shown in FIG. 12, the apparatus 70 further includes a third determining module 708 and a second generation module 709. The third determining module 708 is configured to determine a network traffic feature of a known device based on a second dataset. The second dataset includes a plurality of pieces of third data, and each piece of third data includes a data amount of a data packet that is of the known device and that is collected within one second periodicity. For a specific implementation process, refer to detailed descriptions of step 3031 in the foregoing embodiment. Details are not described herein again. The second generation module 709 is configured to generate the device identification model based on network traffic features of a plurality of known devices and device types of the plurality of known devices. For a specific implementation process, refer to detailed descriptions of step 3032 in the foregoing embodiment. Details are not described herein again.

Figure 13:
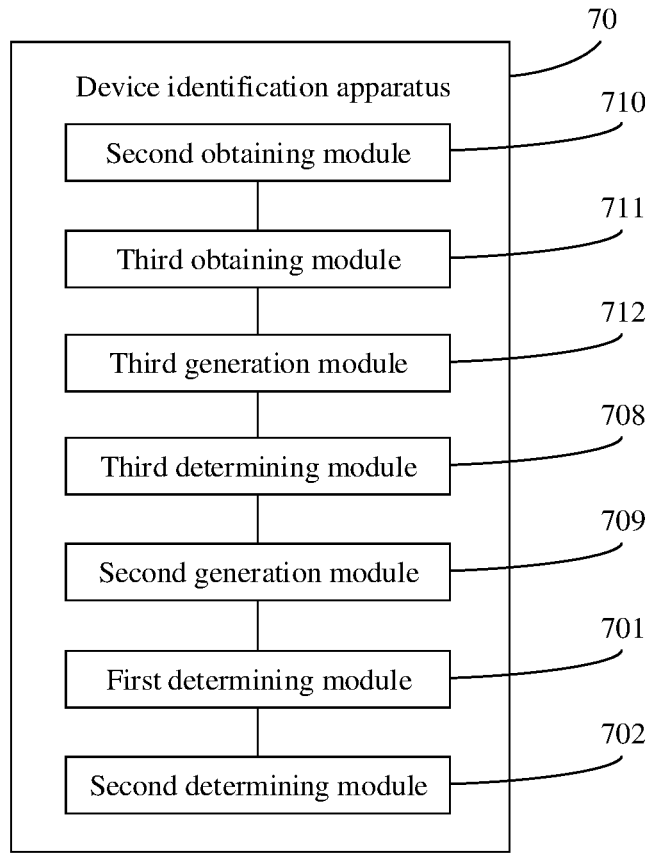
FIG. 13 is a schematic diagram of a structure of another device identification apparatus according to another embodiment of this application.

Optionally, as shown in FIG. 13, the apparatus 70 further includes: a second obtaining module 710, configured to obtain headers of a plurality of data packets collected by a collection device that is in a second network and a moment at which the collection device collects the plurality of data packets, where the headers each include a source IP address, a destination IP address, and a packet length, and the second network is a network accessed by the known device; a third obtaining module 711, configured to obtain a header of a data packet of the known device from the headers of the plurality of data packets based on prior information, where the prior information includes a plurality of device types and identifiers of a plurality of known devices corresponding to each of the device types; and a third generation module 712, configured to generate the second dataset based on a packet length in the header of the data packet of the known device and a moment at which the collection device collects the data packet of the known device. For a specific implementation process, refer to detailed descriptions of step 3031 in the foregoing embodiment. Details are not described herein again.

Optionally, the third determining module 708 is configured to: generate, based on the second dataset, a second data amount time series $(T_m, S_m)$ corresponding to the known device, where $T_m$ represents an $m^{th}$ second periodicity, $S_m$ represents a data amount of a data packet that is of the known device and that is collected within the $m^{th}$ second periodicity, and m is a positive integer; and determine the network traffic feature of the known device based on the second data amount time series $(T_m, S_m)$. For a specific implementation process, refer to detailed descriptions of step 3031 in the foregoing embodiment. Details are not described herein again.

Optionally, the third determining module 708 is configured to: determine, based on the second data amount time series $(T_m, S_m)$, a data amount distribution feature corresponding to the known device; and/or perform a frequency-domain change on the second data amount time series $(T_m, S_m)$ to obtain a data amount frequency-domain feature corresponding to the known device, where the data amount frequency-domain feature includes a frequency and/or an amplitude of the second data amount time series $(T_m, S_m)$. For a specific implementation process, refer to detailed descriptions of step 3031 in the foregoing embodiment. Details are not described herein again.

Figure 14:
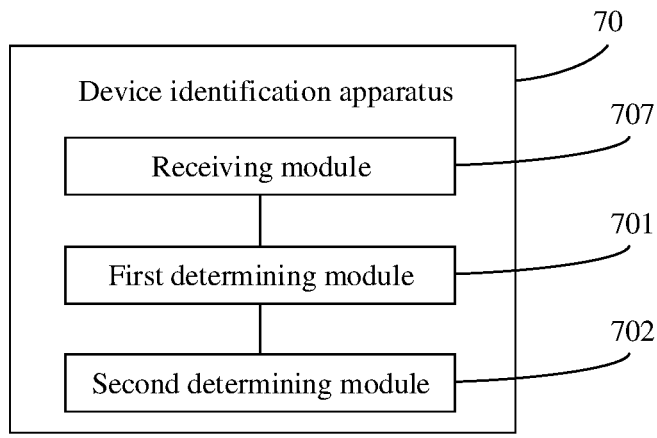
FIG. 14 is a schematic diagram of a structure of still another device identification apparatus according to another embodiment of this application.

Optionally, as shown in FIG. 14, the apparatus 70 further includes a receiving module 707, configured to receive a device identification model from another device or platform. In other words, the device identification model may be from the another device or platform.

For the apparatus in the foregoing embodiment, specific manners of executing operations by each module are described in detail in embodiments related to the method, and details are not described herein.

In conclusion, in the device identification apparatus provided in this embodiment of this application, the first determining module determines the network traffic feature of the to-be-identified device based on the data amounts of the data packets that are of the to-be-identified device and that are collected by the collection device within the plurality of periodicities, and then the second determining module invokes the device identification model to determine the device type of the to-be-identified device based on the network traffic feature of the to-be-identified device. In a process of performing device identification on a device, the to-be-identified device does not need to report information used to identify the to-be-identified device. Therefore, a service that is run on the to-be-identified device is not interrupted, and reliability of running the service by the to-be-identified device is high. In addition, only the header of the data packet collected by the collection device and the moment at which the collection device collects the data packet need to be obtained and parsed, to count a data amount of a data packet that is of the to-be-identified device within each first periodicity. In a process of performing device identification on the to-be-identified device, data content of the data packet does not need to be parsed, so that security of data in the data packet is high. In this embodiment of this application, a small-sample semi-supervised manner is used. A user only needs to provide all device types of a device that is in a network and a part of IP addresses corresponding to each device type, to count all IP addresses (namely, all devices) corresponding to all the device types in the network. This solution has high implementability.

Figure 15:
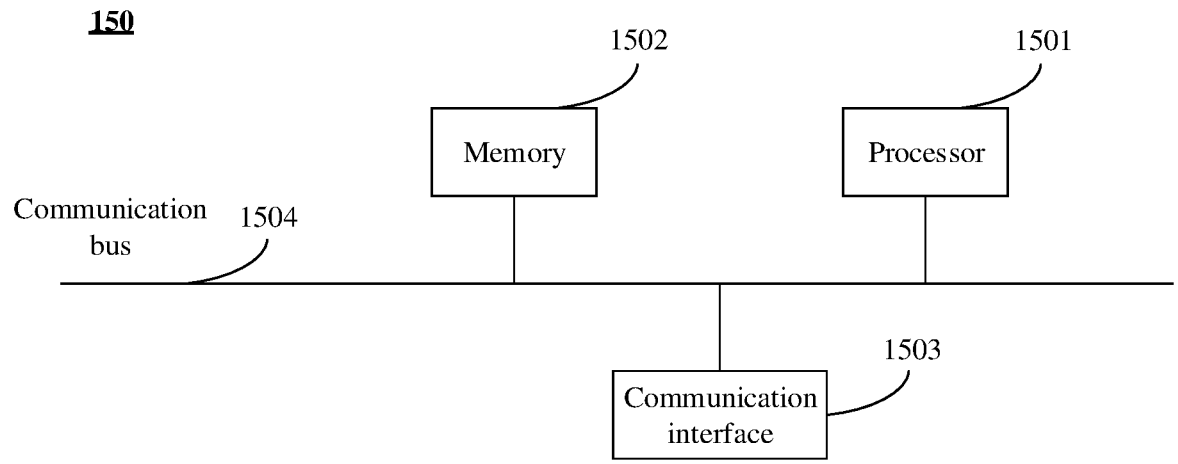
FIG. 15 is a block diagram of a management device according to an embodiment of this application.

An embodiment of this application further provides a management device. As shown in FIG. 15, the management device 150 includes a processor 1501 and a memory 1502.

The memory 1502 is configured to store a computer program, and the computer program includes program instructions.

The processor 1501 is configured to invoke the computer program to implement a step performed by the management device in the foregoing method embodiment.

Specifically, the processor 1501 is configured to: determine a network traffic feature of a to-be-identified device based on a first dataset, where the first dataset includes a plurality of pieces of first data, and each piece of first data includes a data amount of a data packet that is of the to-be-identified device and that is collected within one first periodicity; and determine a device type of the to-be-identified device based on a device identification model and the network traffic feature of the to-be-identified device. For a specific implementation process, refer to detailed descriptions of step 301 to step 305 in the embodiment shown in FIG. 3. Details are not described herein again.

In addition, when the modules in FIG. 7 to FIG. 14 are implemented by using software, the foregoing program modules may be stored in the memory 1502, and the processor 1501 executes the software modules in the memory 1502 to perform a processing step and a function of the management device in the foregoing method embodiment.

Optionally, the apparatus 1500 further includes a communication interface 1503 and a communication bus 1504.

The processor 1501 includes one or more processing cores, and the processor 1501 executes various function applications and data processing by running the computer program.

The memory 1502 may be configured to store the computer program. Optionally, the memory 1502 may store an operating system. The operating system may be an operating system, for example, a real-time operating system (RTX), LINUX, UNIX, WINDOWS, or OS X.

There may be a plurality of communication interfaces 1503, and the communication interface 1503 is configured to communicate with another device, for example, communicate with a collection device that is in a network.

The memory 1502 and the communication interface 1503 are separately connected to the processor 1501 through the bus 1504.

Figure 16:
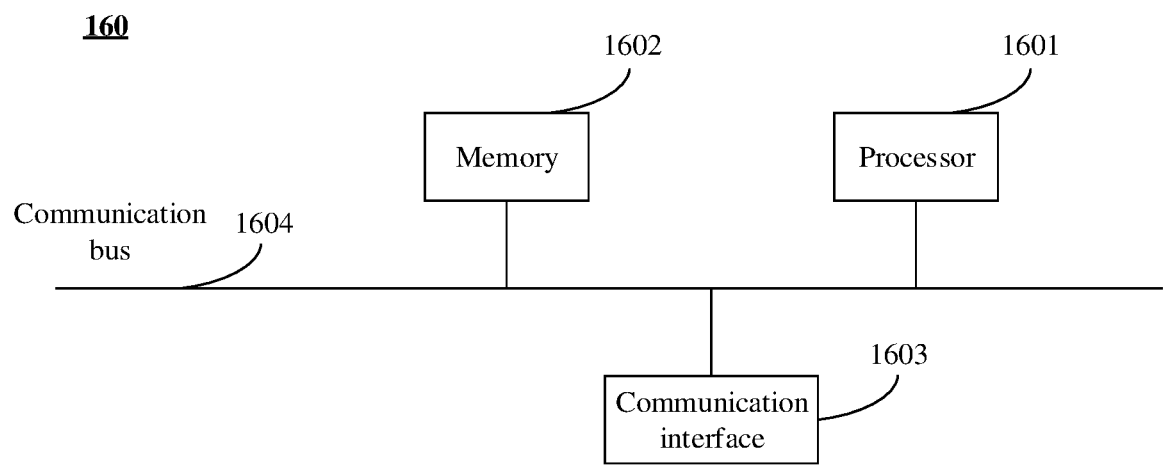
FIG. 16 is a block diagram of a collection device according to an embodiment of this application.

An embodiment of this application further provides a collection device. As shown in FIG. 16, the collection device 160 includes a processor 1601 and a memory 1602.

The memory 1602 is configured to store a computer program, and the computer program includes program instructions.

The processor 1601 is configured to invoke the computer program to implement a step performed by the collection device in the foregoing method embodiment.

Specifically, the processor 1601 is configured to: determine a network traffic feature of a to-be-identified device based on a first dataset, where the first dataset includes a plurality of pieces of first data, and each piece of first data includes a data amount of a data packet that is of the to-be-identified device and that is collected within one first periodicity; and determine a device type of the to-be-identified device based on a device identification model and the network traffic feature of the to-be-identified device. For a specific implementation process, refer to detailed descriptions of step 301 to step 305 in the embodiment shown in FIG. 3. Details are not described herein again.

In addition, when the modules in FIG. 7 to FIG. 9 and FIG. 12 to FIG. 14 are implemented by using software, the foregoing program modules may be stored in the memory 1602, and the processor 1601 executes the software modules in the memory 1602 to perform a processing step and a function of the collection device in the foregoing method embodiment.

Optionally, the apparatus 1600 further includes a communication interface 1603 and a communication bus 1604.

The processor 1601 includes one or more processing cores, and the processor 1601 executes various function applications and data processing by running the computer program.

The memory 1602 may be configured to store the computer program. Optionally, the memory 1602 may store an operating system. The operating system may be an operating system, for example, a real-time operating system (RTX), LINUX, UNIX, WINDOWS, or OS X.

There may be a plurality of communication interfaces 1603, and the communication interface 1603 is configured to communicate with another device, for example, communicate with a management device that is in a network.

The memory 1602 and the communication interface 1603 are separately connected to the processor 1601 through the bus 1604.

Figure 17:
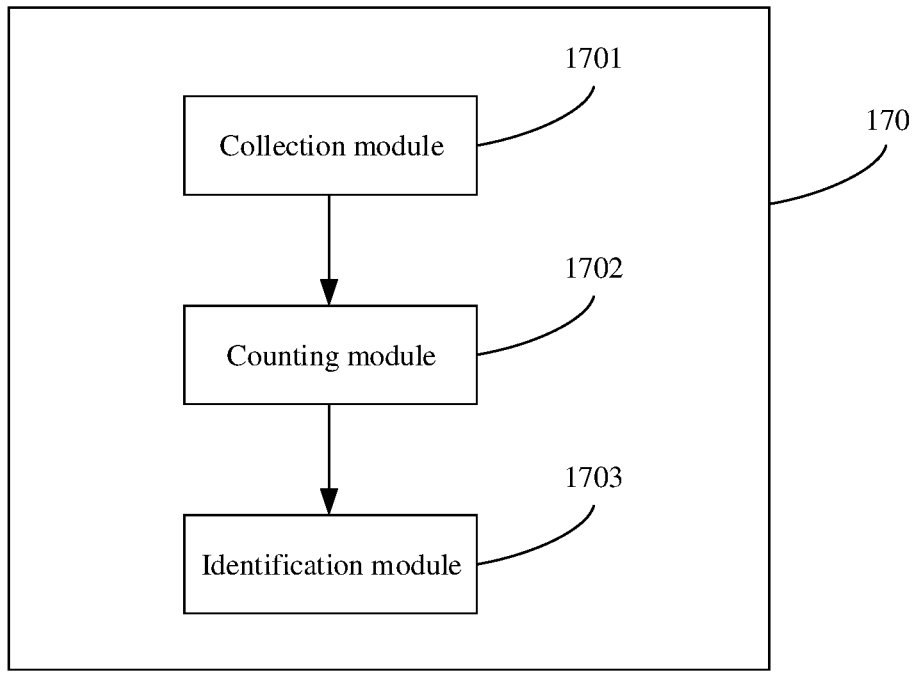
FIG. 17 is a schematic diagram of a structure of a device identification system according to an embodiment of this application.

An embodiment of this application further provides a device identification system. As shown in FIG. 17, the system 170 includes a collection module 1701, a counting module 1702, and an identification module 1703.

The collection module 1701 is configured to: collect a header of a data packet in a network, and send, to the counting module 1702, collected headers of a plurality of data packets and a moment at which the collection module 1701 collects the plurality of data packets. The headers each include a source Internet Protocol IP address, a destination IP address, and a packet length.

The counting module 1702 is configured to: generate a first dataset based on the headers of the plurality of data packets and the moment at which the collection module collects the plurality of data packets, and send the first dataset to the identification module 1703. The first dataset includes a plurality of pieces of first data, and each piece of first data includes a data amount of a data packet that is of a to-be-identified device and that is collected within one first periodicity.

The identification module 1703 is configured to: determine a network traffic feature of the to-be-identified device based on the first dataset, and determine a device type of the to-be-identified device based on a device identification model and the network traffic feature of the to-be-identified device.

Figure 18:
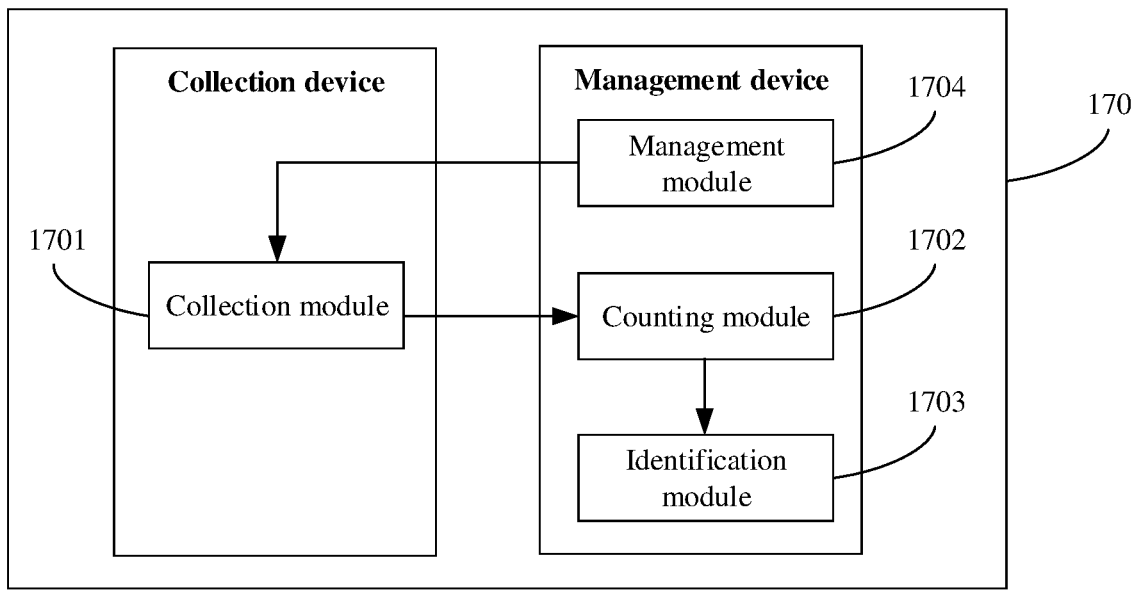
FIG. 18 is a schematic diagram of a structure of another device identification system according to an embodiment of this application.
Figure 19:
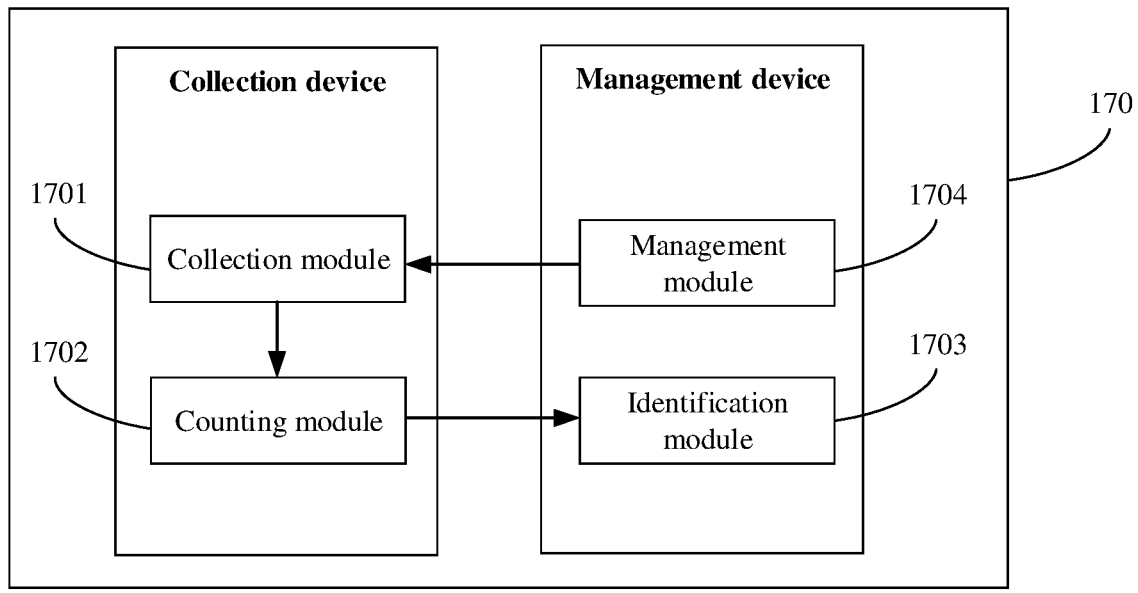
FIG. 19 is a schematic diagram of a structure of still another device identification system according to an embodiment of this application.

Optionally, as shown in FIG. 18 or FIG. 19, the system 170 further includes a management module 1704.

The management module 1704 is configured to send a traffic collection instruction to the collection module 1701. The traffic collection instruction is used to instruct the collection module to collect the header of the data packet in the network. The collection module 1701 is configured to collect the header of the data packet in the network based on the traffic collection instruction.

Optionally, refer to FIG. 18. The collection module 1701 is in a collection device, and the management module 1704, the counting module 1702, and the identification module 1703 are in a management device. Alternatively, refer to FIG. 19, the collection module 1701 and the counting module 1702 are in a collection device, and the management module 1704 and the identification module 1703 are in a management device.

Optionally, the traffic collection instruction includes an identifier of the to-be-identified device, and the traffic collection instruction is used to instruct the collection module 1701 to collect a header of a data packet of the to-be-identified device. The collection module 1701 is configured to collect, based on the traffic collection instruction, a header of a data packet that is of the to-be-identified device and that is in the network.

Figure 20:
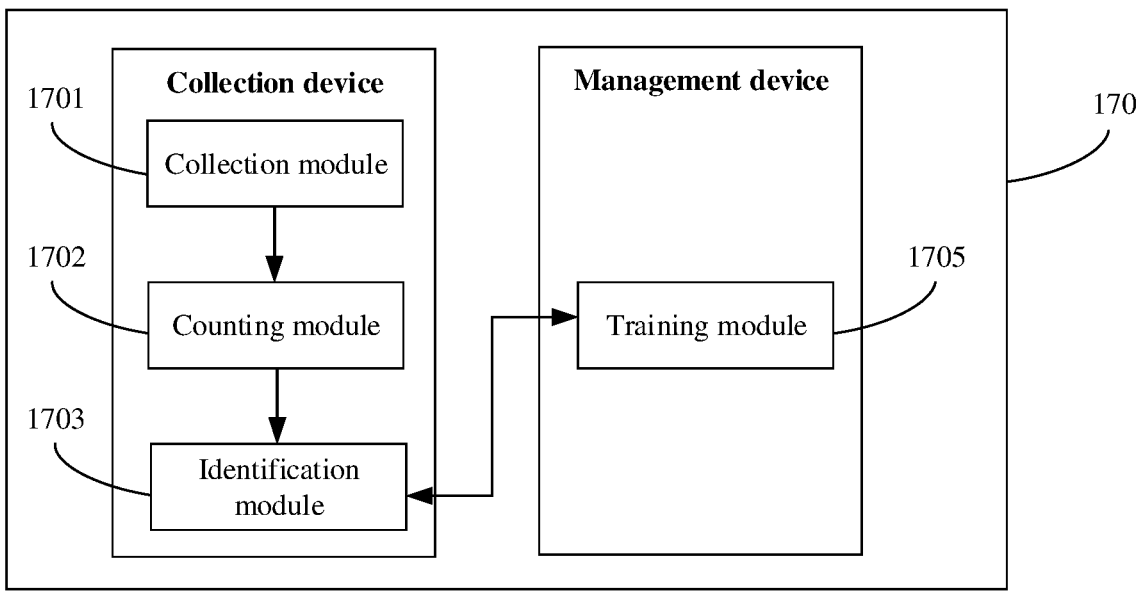
FIG. 20 is a schematic diagram of a structure of yet another device identification system according to an embodiment of this application.
Figure 21:
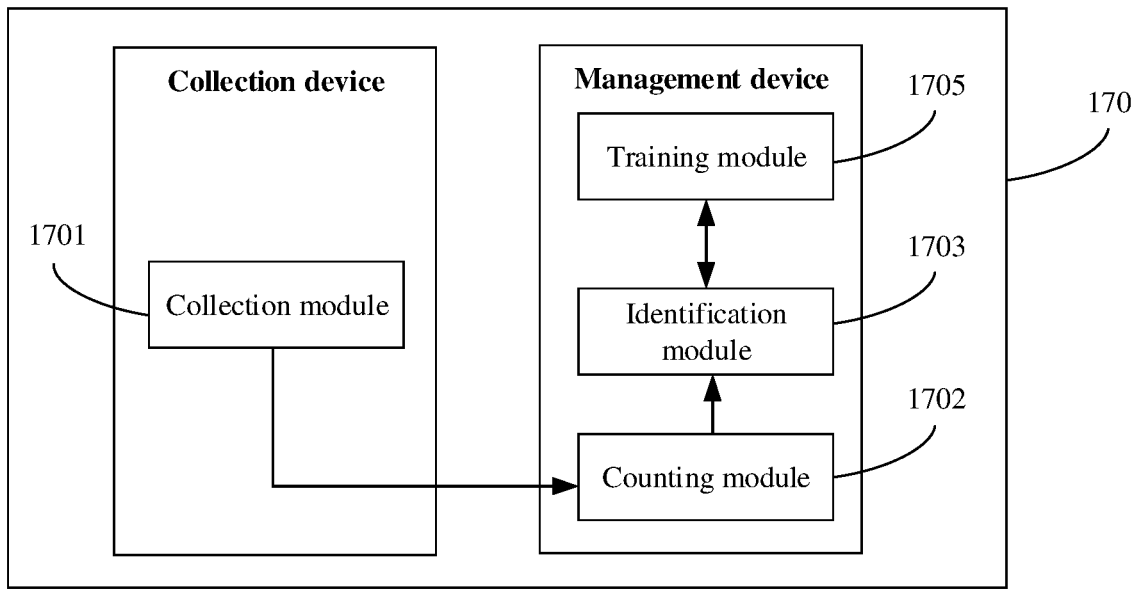
FIG. 21 is a schematic diagram of a structure of yet still another device identification system according to an embodiment of this application.
Figure 22:
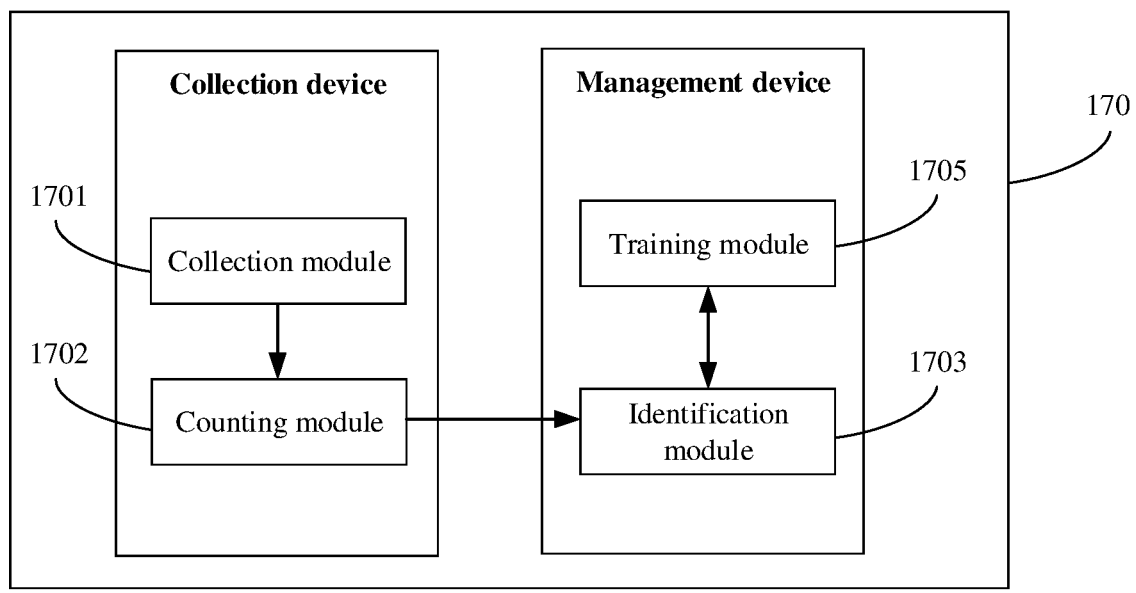
FIG. 22 is a schematic diagram of a structure of a further device identification system according to an embodiment of this application.

Optionally, as shown in any one of FIG. 20 to FIG. 22, the system 170 further includes a training module 1705.

The collection module 1701 is further configured to send, to the training module 1705, the collected headers of the plurality of data packets and the moment at which the collection module 1701 collects the plurality of data packets. The training module 1705 is configured to: generate a second dataset based on prior information, the headers of the plurality of data packets, and the moment at which the collection module collects the plurality of data packets, determine network traffic features of a plurality of known devices based on the second dataset, then generate the device identification model based on the network traffic features of the plurality of known devices and device types of the plurality of known devices, and send the device identification model to the identification module 1703. The prior information includes a plurality of device types and identifiers of a plurality of known devices corresponding to each of the device types. The second dataset includes a plurality of pieces of second data, and each piece of second data includes a data amount of a data packet that is of the known device and that is collected within one second periodicity.

Optionally, the identification module 1703 is further configured to send, to the training module 1705, the network traffic feature of the to-be-identified device and the device type of the to-be-identified device. The training module 1705 is further configured to: update the device identification model based on the network traffic feature of the to-be-identified device and the device type of the to-be-identified device, and send an updated device identification model to the identification module 1703. Alternatively, the identification module 1703 is further configured to send the network traffic feature of the to-be-identified device to the training module 1705. The training module 1705 is further configured to: update the device identification model based on the network traffic feature of the to-be-identified device and an externally input device type of the to-be-identified device, and send an updated device identification model to the identification module 1703. In this way, the device identification model is updated and optimized.

Optionally, refer to FIG. 20. The collection module 1701, the counting module 1702, and the identification module 1703 are in the collection device, and the training module 1705 is in the management device. Alternatively, refer to FIG. 21. The collection module 1701 is in the collection device, and the counting module 1702, the identification module 1703, and the training module 1705 are in the management device. Alternatively, refer to FIG. 22. The collection module 1701 and the counting module 1702 are in the collection device, and the identification module 1703 and the training module 1705 are in the management device.

In some embodiments, the modules in the device identification system 170 may be deployed in a same physical device. In some other embodiments, the modules in the device identification system 170 may be deployed in a plurality of different physical devices. Each module in the device identification system 170 may be a hardware module or a module combining software and hardware.

An embodiment of this application further provides a computer-readable storage medium. The computer-readable storage medium stores instructions. When the instructions are executed by a processor of a management device, the device identification method in the foregoing method embodiment is implemented. Alternatively, when the instructions are executed by a processor of a collection device, the device identification method in the foregoing method embodiment is implemented.

An embodiment of this application further provides a computer program product. The computer program product includes computer instructions, and the computer instructions are stored in a computer-readable storage medium. A processor of a management device reads the computer instructions from the computer-readable storage medium and executes the computer instructions, to implement the device identification method in the foregoing method embodiment. Alternatively, a processor of a collection device reads the computer instructions from the computer-readable storage medium and executes the computer instructions, to implement the device identification method in the foregoing method embodiment.

A person of ordinary skill in the art may understand that all or some of the steps of the foregoing embodiment may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

The foregoing descriptions are merely optional embodiments of this application, but are not intended to limit this application. Any modification, equivalent replacement, or improvement made within the concept and principle of this application should fall within the protection scope of this application.

What is claimed is:

1. A device identification method, wherein the method comprises:

determining a network traffic feature of a to-be-identified device based on a first dataset, wherein the first dataset comprises a plurality of pieces of first data, wherein each piece of first data comprises a data amount of a data packet that is related to the to-be-identified device and that is collected within a first periodicity, and wherein the data packet is a heartbeat packet having a packet length less than a target length threshold; and determining a device type of the to-be-identified device based on a device identification model and the network traffic feature of the to-be-identified device by inputting the network traffic feature of the to-be-identified device to the device identification model;

wherein the device identification model is a machine learning model obtained through training based on network traffic features of a plurality of known devices of a known device type.

2. The method according to claim 1, wherein the determining the network traffic feature of the to-be-identified device based on the first dataset comprises:

generating, based on the first dataset, a first data amount time series $(T_n, S_n)$ corresponding to the to-be-identified device, wherein $T_n$ represents an nth first periodicity, $S_n$ represents a data amount of a data packet that is related to the to-be-identified device and that is collected within the $n^{th}$ first periodicity, and n is a positive integer; and determining the network traffic feature of the to-be-identified device based on the first data amount time series $(T_n, S_n)$.

3. The method according to claim 2, wherein the determining the network traffic feature of the to-be-identified device based on the first data amount time series $(T_n, S_n)$ comprises at least one of:

determining, based on the first data amount time series $(T_n, S_n)$, a data amount distribution feature corresponding to the to-be-identified device; or performing a frequency-domain change on the first data amount time series $(T_n, S_n)$ to obtain a data amount frequency-domain feature corresponding to the to-be-identified device, wherein the data amount frequency-domain feature comprises at least one of a frequency or an amplitude of the first data amount time series $(T_n, S_n)$.

4. The method according to claim 2, wherein the generating, based on the first dataset, the first data amount time series $(T_n, S_n)$ corresponding to the to-be-identified device comprises at least one of:

generating, based on the first dataset, in response to the plurality of pieces of first data comprising data amounts of uplink data packets that are related to the to-be-identified device and that are collected within a plurality of first periodicities, an uplink data amount time series corresponding to the to-be-identified device; or generating, based on the first dataset, in response to the plurality of pieces of first data comprising data amounts of downlink data packets that are related to the to-be-identified device and that are collected within a plurality of first periodicities, a downlink data amount time series corresponding to the to-be-identified device.

5. The method according to claim 1, wherein the method further comprises:

sending a statistical information collection instruction to a collection device that is in a first network; and performing one of:

obtaining the first dataset by receiving, in response to the statistical information collection instruction instructing the collection device to count data amounts of data packets that are of the to-be-identified device and that are collected within a plurality of first periodicities, the plurality of pieces of first data sent by the collection device that is in the first network; or performing:

receiving, in response to the statistical information collection instruction instructing the collection device to count data amounts of data packets that are of the to-be-identified device and that are collected at a plurality of collection moments, a plurality of pieces of second data sent by the collection device that is in the first network; and generating the first dataset, based on the plurality of pieces of second data, wherein each piece of second data comprises one collection moment, and based on a data amount of a data packet that is related to the to-be-identified device and that is collected at the collection moment.

6. The method according to claim 1, wherein the method further comprises:

determining a network traffic feature of a known device based on a second dataset, wherein the second dataset comprises a plurality of pieces of third data, and wherein each piece of third data comprises a data amount of a data packet that is related to the known device and that is collected within a second periodicity; and generating the device identification model.

7. The method according to claim 1, wherein the network traffic feature comprises a data amount distribution feature or a data amount frequency-domain feature.

8. An apparatus, comprising:

at least one processor; and at least one non-transitory computer-readable storage medium storing instructions and configured to execute the instructions to cause the apparatus to:

determine a network traffic feature of a to-be-identified device based on a first dataset, wherein the first dataset comprises a plurality of pieces of first data, wherein each piece of first data comprises a data amount of a data packet that is related to the to-be-identified device and that is collected within a first periodicity, and wherein the data packet is a heartbeat packet having a packet length less than a target length threshold; and determine a device type of the to-be-identified device based on a device identification model and the network traffic feature of the to-be-identified device by inputting the network traffic feature of the to-be-identified device to the device identification model;

wherein the device identification model is a machine learning model obtained through training based on network traffic features of a plurality of known devices of a known device type.

9. The apparatus according to claim 8, wherein the instructions further include instructions to:

generate, based on the first dataset, a first data amount time series $(T_n, S_n)$ corresponding to the to-be-identified device, wherein $T_n$ represents an $n^{th}$ first periodicity, $S_n$ represents a data amount of a data packet that is related to the to-be-identified device and that is collected within the $n^{th}$ first periodicity, and n is a positive integer; and determine the network traffic feature of the to-be-identified device based on the first data amount time series $(T_n, S_n)$.

10. The apparatus according to claim 9, wherein the instructions further include instructions to at least one of:

determine, based on the first data amount time series $(T_n, S_n)$, a data amount distribution feature corresponding to the to-be-identified device; or obtain a data amount frequency-domain feature corresponding to the to-be-identified device by performing a frequency-domain change on the first data amount time series $(T_n, S_n)$, wherein the data amount frequency-domain feature comprises at least one of a frequency or an amplitude of the first data amount time series $(T_n, S_n)$.

11. The apparatus according to claim 9, wherein the instructions further include instructions to at least one of:
generate, based on the first dataset, in response to the plurality of pieces of first data comprising data amounts of uplink data packets that are related to the to-be-identified device and that are collected within a plurality of first periodicities, an uplink data amount time series corresponding to the to-be-identified device; or
generate, based on the first dataset, in response to the plurality of pieces of first data comprising data amounts of downlink data packets that are related to the to-be-identified device and that are collected within a plurality of first periodicities, a downlink data amount time series corresponding to the to-be-identified device.

12. The apparatus according to claim 8, wherein the instructions further include instructions to:
determine a network traffic feature of a known device based on a second dataset, wherein the second dataset comprises a plurality of pieces of third data, and wherein each piece of third data comprises a data amount of a data packet that is related to the known device and that is collected within one second periodicity; and
generate the device identification model.

13. The apparatus according to claim 8, wherein the network traffic feature comprises a data amount distribution feature or a data amount frequency-domain feature.

* * * * *